(12) United States Patent
Fukusaka et al.

(10) Patent No.: US 7,138,224 B2
(45) Date of Patent: Nov. 21, 2006

(54) SQUARYLIUM COMPOUND AND PHOTOTHERMOGRAPHIC MATERIAL CONTAINING THE SAME

(75) Inventors: Kiyoshi Fukusaka, Fussa (JP); Osamu Ishige, Kawasaki (JP); Rie Sakuragi, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/238,575

(22) Filed: Sep. 29, 2005

(65) Prior Publication Data

US 2006/0078834 A1    Apr. 13, 2006

(30) Foreign Application Priority Data

Oct. 7, 2004 (JP) ............................ 2004-294663
Feb. 14, 2005 (JP) ............................ 2005-035778

(51) Int. Cl.
*G03C 1/00* (2006.01)
*G03C 1/08* (2006.01)
*G03C 7/26* (2006.01)
*G03C 7/32* (2006.01)
*G03C 5/16* (2006.01)

(52) U.S. Cl. .................. 430/617; 430/618; 430/619; 430/620; 430/517; 430/559; 430/348; 430/350

(58) Field of Classification Search ........ 430/617–620, 430/517, 559, 348, 350
See application file for complete search history.

(56) References Cited

U.S. PATENT DOCUMENTS

| | | | |
|---|---|---|---|
| 3,152,904 A | 10/1964 | Sorensen et al. | |
| 3,487,075 A | 12/1969 | Davis et al. | |
| 6,342,340 B1 * | 1/2002 | Tanaka et al. | 430/559 |
| 6,413,711 B1 | 7/2002 | Kimura | |
| 6,444,415 B1 * | 9/2002 | Tanaka et al. | 430/517 |
| 6,482,950 B1 | 11/2002 | Garcia et al. | |
| 2002/0110767 A1 | 8/2002 | Tanaka et al. | |

FOREIGN PATENT DOCUMENTS

| EP | 1 083 459 A1 | 3/2001 |
|---|---|---|
| JP | 58-220143 A | 12/1983 |
| JP | 2003-302724 A | 10/2003 |

OTHER PUBLICATIONS

David A. Morgan, "Dry Silver Photographic Materials", *Handbook of Imaging Materials*, pp. 43-60 (1991).
Patent Abstracts of Japan, vol. 2003, No. 12, Dec. 5, 2003, of JP 2003 302724 A, (Konica Minolta Holdings, Inc.), Oct. 24, 2003.

* cited by examiner

*Primary Examiner*—Geraldine Letscher
(74) *Attorney, Agent, or Firm*—Frishauf, Holtz, Goodman & Chick, P.C.

(57) ABSTRACT

A photothermographic material containing a support having on one side of the support a photosensitive layer containing: photosensitive silver halide grains; and a compound represented by Formula (1) or Formula (2):

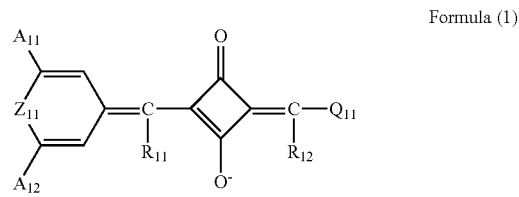

Formula (1)

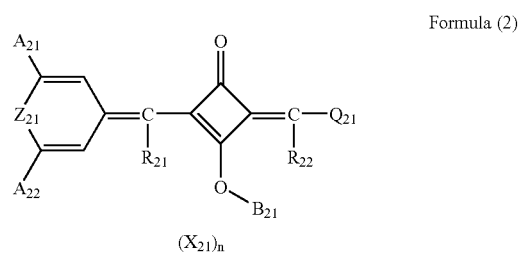

Formula (2)

wherein the symbols in Formulas (1) and (2) are indicated in the specification.

4 Claims, No Drawings

SQUARYLIUM COMPOUND AND PHOTOTHERMOGRAPHIC MATERIAL CONTAINING THE SAME

This application is based on Japanese Patent Application Nos. 2004-294663 and 2005-035778, each respectively filed on Oct. 7, 2004 and Feb. 14, 2005 in Japanese Patent Office, the entire contents of which are hereby incorporated by reference.

TECHNICAL FIELD

The present invention relates to a photothermographic material containing a novel dye, and also relates to an image forming method using the same photothermographic material.

BACKGROUND

In recent years, in the medical and graphic arts fields, a decrease in the processing effluent has been increasingly demanded from the viewpoint of environmental protection as well as space saving.

As a result, techniques have been sought which relate to photothermographic materials which can be effectively exposed, employing laser imagers and laser image setters, and can form clear black-and-white images exhibiting high resolution.

As described, for example, in Patent Documents 1 and 2, or Non-patent Document 1, known as materials related to the above techniques are heat developable photosensitive materials (hereinafter also simply referred to as photosensitive materials) which incorporate a support having thereon organic silver salts, photosensitive silver halide grains, and reducing agents. Since the above photosensitive materials do not employ any of the solution based processing chemicals, it is possible to provide customers with simpler systems which do not despoil the environment.

Incidentally, in order to minimize degradation of sharpness due to reflection and refraction of incident light during exposure, antihalation (AH) dyes and antiirradiation (AI) dyes have been widely employed in the above photosensitive materials. Listed as characteristics desired for AH and AI dyes are as follows. These dyes sufficiently absorb light of the desired wavelength, do not adversely affect silver halide emulsions, and do not stain photosensitive materials after photographic processing.

However, are known almost no infrared dyes which exhibit the maximum absorption in the near infrared region, especially in the region of 700–850 nm, and which exhibit minimal secondary absorption in the visible region. Listed as a few of such reported examples are squalirium dyes described in Patent Documents 3 and 4. However, in cases in which the described dyes are employed in photosensitive materials, their thermal stability in such photosensitive materials is unsatisfactory, whereby further improvements have been sought.

[Patent Document 1] U.S. Pat. No. 3,152,904

[Patent Document 2] U.S. Pat. No. 3,487,075

[Non-patent Document 1] David A. Morgan, "Dry Silver Photographic Materials", (Handbook of Imaging Materials, Marcel Dekker, Inc. page 43 to 60, 1991).

[Patent Document 3] Japanese Patent Application Open to Public Inspection (hereinafter it is called as JP-A) No. 58-220143

[Patent Document 4] U.S. Pat. No. 6,482,950

SUMMARY

An object of the present invention is to provide a photothermographic material which exhibits excellent storage stability under high temperature and high,humidity. Another object is to provide an image forming method using the same photothermographic material.

The above-described object can be achieved by the following structures (1) An aspect of the present invention includes a photothermographic material comprising a support having on one side of the support a photosensitive layer comprising:

photosensitive silver halide grains; and a compound represented by Formula (1) or Formula (2):

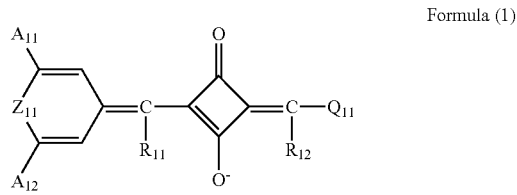

Formula (1)

wherein $R_{11}$ and $R_{12}$ are each independently a hydrogen atom or a substituent; $Z_{11}$ is O, S, N—$R_1$, Se or Te, provided that $R_1$ is an alkyl group or an aryl group; $Q_{11}$ is a 6-membered heterocyclic group; $A_{11}$ and $A_{12}$ are each independently a substituent, provided that $A_{11}$ and $A_{12}$ are different groups from each other,

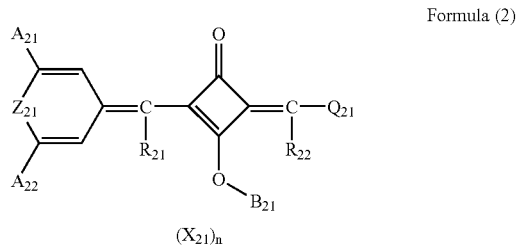

Formula (2)

wherein $R_{21}$ and $R_{22}$ are each independently a hydrogen atom or a substituent; $Z_{21}$ is O, S, N—$R_2$, Se or Te, provided that $R_2$ is an alkyl group or an aryl group; $Q_{21}$ is a 6-membered heterocyclic group; $A_{21}$ and $A_{22}$ are each independently a substituent, provided that $A_{21}$ and $A_{22}$ are different groups from each other; $B_{21}$ is an alkyl group or an aryl group; $X_{21}$ is an ion which compensate an electric charge of the molecule; and n is 0 or 1, provided that n is 0 when the molecule forms an inner salt.

(2) Another aspect of the present invention includes a photothermographic material of the above-described item 1, wherein Formula (1) is further represented by Formula (3), and Formula (2) is further represented by Formula (4):

Formula (3)

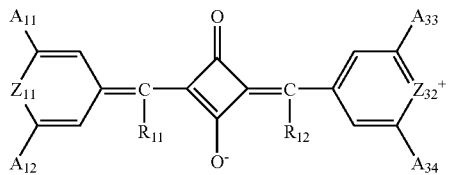

wherein $R_{11}$ and $R_{12}$ are each respectively the same as $R_{11}$ and $R_{12}$ in Formula (1); $Z_{11}$ is the same as $Z_{11}$ in Formula (1); $A_{11}$ and $A_{12}$ are each respectively the same as $A_{11}$ and $A_{12}$ in Formula (1); $Z_{32}$ is O, S, N—$R_3$, Se or Te, provided that $R_3$ is an alkyl group or an aryl group; and $A_{33}$ and $A_{34}$ are each independently a hydrogen atom or a substituent, Formula (4)

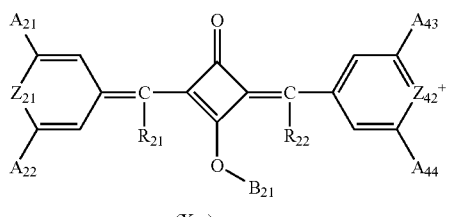

wherein $R_{21}$ and $R_{22}$ are each respectively the same as $R_{21}$ and $R_{22}$ in Formula (2); $Z_{21}$ is the same as $Z_{21}$ in Formula (2); $A_{21}$ and $A_{22}$ are each respectively the same as $A_{21}$ and $A_{22}$ in Formula (2); $Z_{32}$ is O, S, N—$R_3$, Se or Te, provided that $R_3$ is an alkyl group or an aryl group; and $A_{33}$ and $A_{34}$ are each independently a hydrogen atom or a substituent; $B_{21}$ is the same as $B_{21}$ in Formula (2); $X_{21}$ is the same as $X_{21}$ in Formula (2); n is the same as n in Formula (2); $Z_{42}$ is O, S, N—$R_4$, Se or Te, provided that $R_4$ is an alkyl group or an aryl group; and $A_{43}$ and $A_{44}$ are each independently a hydrogen atom or a substituent.

(3) Another aspect of the present invention includes a photothermographic material of the above-described item 2, wherein Formula (3) is further represented by Formula (5), and Formula (4) is further represented by Formula (6):

Formula (5)

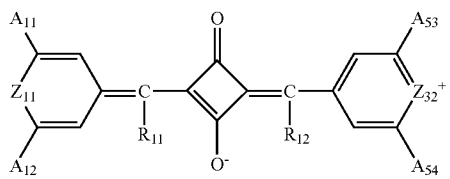

wherein $R_{11}$ and $R_{12}$ are each respectively the same as $R_{11}$ and $R_{12}$ in Formula (1); $Z_{11}$ is the same as $Z_{11}$ in Formula (1); $A_{11}$ and $A_{12}$ are each respectively the same as $A_{11}$ and $A_{12}$ in Formula (1); $Z_{32}$ is the same as $Z_{32}$ in Formula (3); and $A_{53}$ and $A_{54}$ are each independently a substituent, provided that $A_{53}$ and $A_{54}$ are different groups from each other, Formula (6)

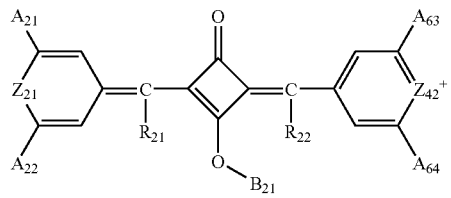

wherein $R_{21}$ and $R_{22}$ are each respectively the same as $R_{21}$ and $R_{22}$ in Formula (2); $Z_{21}$ is the same as $Z_{21}$ in Formula (2); $A_{21}$ and $A_{22}$ are each respectively the same as $A_{21}$ and $A_{22}$ in Formula (2); $B_{21}$ is the same as $B_{21}$ in Formula (2); $X_{21}$ is the same as $X_{21}$ in Formula (2); n is the same as n in Formula (2); $Z_{42}$ is the same as $Z_{42}$ in Formula (4); and $A_{63}$ and $A_{64}$ are each independently a substituent, provided that $A_{63}$ and $A_{64}$ are different groups from each other.

(4) Another aspect of the present invention includes a photothermographic material of the above-described item 3, wherein Formula (5) is further represented by Formula (7), and Formula (6) is further represented by Formula (8):

Formula (7)

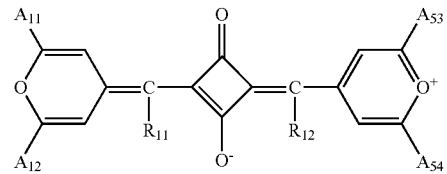

wherein $R_{11}$ and $R_{12}$ are each respectively the same as $R_{11}$ and $R_{12}$ in Formula (1); $A_{11}$ and $A_{12}$ are each respectively the same as $A_{11}$ and $A_{12}$ in Formula (1); and $A_{53}$ and $A_{54}$ are each respectively the same as $A_{53}$ and $A_{54}$ in Formula (5), Formula (8)

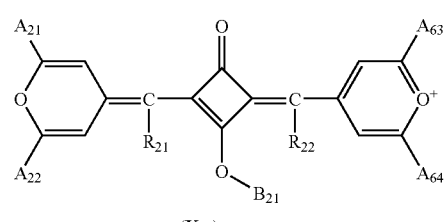

wherein $R_{21}$ and $R_{22}$ are each respectively the same as $R_{21}$ and $R_{22}$ in Formula (2); $A_{21}$ and $A_{22}$ are each respectively the same as $A_{21}$ and $A_{22}$ in Formula (2); $B_{21}$ is the same as $B_{21}$ in Formula (2); $X_{21}$ is the same as $X_{21}$ in Formula (2); n is the same as n in Formula (2); and $A_{63}$ and $A_{64}$ are each respectively the same as $A_{63}$ and $A_{64}$ in Formula (6).

(5) Another aspect of the present invention includes a method of forming an image comprising the steps of:

exposing the photothermographic material with a laser; and heating the exposed photothermographic material to a temperature of 80 to 250° C.

(6) Another aspect of the present invention includes a squarylium compound represented by Formula (7) or Formula (8) in the above-described item 4.

(7) Another aspect of the present invention includes a squarylium compound represented by Formula (7) in the above-described item 6 is further represented by Formula (9),

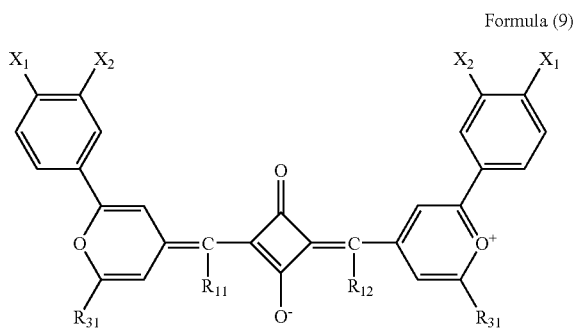

Formula (9)

wherein $R_{11}$ and $R_{12}$ are each respectively the same as $R_{11}$ and $R_{12}$ in Formula (1); $X_1$ and $X_2$ are each independently a halogen atom; and $R_{31}$ is an alkyl group.

Through the present invention, it is possible to provide a photothermographic material which exhibits excellent storage stability under high temperature and high humidity, and it is possible to provide an image forming method using the same.

DESCRIPTION OF THE PREFERRED EMBODIMENTS

The inventors of the present invention conducted diligent investigation and discovered that in a heat developable photosensitive material which incorporated a support having, on at least one side, a photosensitive layer incorporating photosensitive silver halide, when the compound represented by above Formula (1) or (2) is incorporated, it is possible to prepare a heat developable photosensitive material which exhibits excellent storage stability at high temperature and high humidity.

Further, the compounds represented by above Formula (7) or (8) are novel ones which are preferably employed in the present invention.

The present invention will now be detailed.

(Compounds Represented by Formula (1))

In above Formula (1), $R_{11}$ and $R_{12}$ each independently represent a hydrogen atom or a substituent. Listed as substituents represented by $R_{11}$ and $R_{12}$ are an alkyl group, a cycloalkyl group, an alkenyl group, an alkynyl group, an aryl group, a heterocyclic group, a halogen atom, and a cyano group. Of these, preferred are the hydrogen atom, the alkyl group and the aryl group, while more preferred is the hydrogen atom or the alkyl group.

$Z_{11}$ represents O, S, N—$R_1$, Se or Te, wherein $R_1$ represents an alkyl, group or an aryl group. Of these preferred is O, S, or N—$R_1$, while more preferred is O or S.

$Q_{11}$ represents a 6-membered heterocyclic ring, which includes pyrylium, thiopyrylium, selenopyrylium, tellunopyrylium, pyridium, benzopyrylium, benzothiopyrylium, and benzoselenopyrylium. Of these, preferred is pyrylium, thiopyrylium, or selenopyrylium, while more preferred is pyrylium or thiopyrylium. These heterocyclic rings may have a substituent. Listed as substituents are an alkyl group, a cycloalkyl group, a halogenated alkyl group, an alkenyl group, an alkynyl group, an aryl group, a heterocyclic ring group, a halogen atom, a cyano group, a hydroxyl group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an anilino group, an acylamino group, an aminocarbonylamino group, an alkoxycarbonylamino group, an aryloxycarbonylamino group, a sulfamoylamino group, an alkyl- and arylsulfonylamino group, a mercapto group, an alkylthio group, an arylthio group, a heterocyclic thio group, sulfamoyl group, a sulfo group, an alkyl- and arylsulfonyl group, an alkyl- and aryl sulfonyl group, an acyl group, an aryloxycarbonyl group, an alkoxycarbonyl group, a carbamoyl group, an aryl and heterocyclic azo group, an imido group, a silyl group, a hydrazino group, a ureido group, a boron acid group, a phosphate group, a sulfate group, and other related groups known in the art.

$A_{11}$ and $A_{12}$ each independently represent a substituent, which includes an alkyl group, a cycloalkyl group, an alkenyl group, an alkynyl group, an aryl group, a heterocyclic ring group, a halogen atom, and a cyano group. These groups may have a substituent, but $A_{11}$ and $A_{12}$ do not represent the same substituent.

(Compounds Represented by Formula (2))

In above Formula (2), $R_{21}$ and $R_{22}$ each independently represent a hydrogen atom or a substituent. Listed as substituents represented by $R_{21}$ and $R_{22}$ are an alkyl group, a cycloalkyl group, an alkenyl group, an alkynyl group, an aryl group, a heterocyclic ring group, a halogen atom, and a cyano group. Of these, preferred are the hydrogen atom, the alkyl group and the aryl group, while more preferred is the hydrogen atom or the alkyl group.

$Z_{21}$ represents O, S, N—$R_2$, Se or Te, wherein $R_2$ represents an alkyl group or an aryl group. Of these preferred is O, S, or N—$R_2$, while more preferred is O or S.

$Q_{21}$ represents a 6-membered heterocyclic ring, which includes pyrylium, thiopyrylium, selenopyrylium, tellunopyrylium, pyridium, benzopyrylium, benzothiopyrylium, and benzoselenopyrylium. Of these, preferred is pyrylium, thiopyrylium, or selenopyrylium, while more preferred is pyrylium or thiopyrylium. These heterocyclic rings may have a substituent. Listed as such substituent are an alkyl group, a cycloalkyl group, a halogenated alkyl group, an alkenyl group, an alkynyl group, an aryl group, a heterocyclic ring group, a halogen atom, a cyano group, a hydroxyl group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an anilino group, an acylamino group, an aminocarbonylamino group, an alkoxycarbonylamino group, an aryloxycarbonylamino group, a sulfamoylamino group, an alkyl- and arylsulfonylamino group, a mercapto group, an alkylthio group, an arylthio group, a heterocyclic thio group, sulfamoyl group, a sulfo group, an alkyl- and arylsulfonyl group, an alkyl- and aryl sulfonyl group, an acyl group, an aryloxycarbonyl group, an alkoxycarbonyl group, a carbamoyl group, an aryl and heterocyclic azo group, an imido group, a silyl group, a hydrazino group, a ureido group, a boron acid group, a phosphate group, a sulfate group, and other related groups known in the art.

$A_{21}$ and $A_{22}$ each independently represent a substituent, which includes an alkyl group, a cycloalkyl group, an alkenyl group, an alkynyl group, an aryl group, a heterocyclic ring group, a halogen atom, and a cyano group. These groups may have a substituent, but $A_{21}$ and $A_{22}$ do not represent the same substituent.

$B_{21}$ represents an alkyl group or an aryl group, but is preferably the alkyl group. $X_{21}$ represents an ion necessary to eliminate charge in the molecule, while n represents 0 or 1 and when forming an intramolecular salt, n represents 0.

(Compounds Represented by Formula (3))

In above Formula (3), $R_{11}$ and $R_{12}$ are as defined for $R_{11}$ and $R_{12}$ in above Formula (1).

$Z_{11}$ is as defined for $Z_{11}$ in above Formula (1).

$A_{11}$ and $A_{12}$ are as defined for $A_{11}$ and $A_{12}$ in above Formula (1).

$Z_{31}$ represents O, S, N—$R_3$, Se or Te, wherein $R_3$ represents an alkyl group or an aryl group. Of these preferred is O, S, or N—$R_3$, while more preferred is O or S.

$A_{33}$ and $A_{34}$ each independently represent a hydrogen atom or a substituent, which includes an alkyl group, a cycloalkyl group, an alkenyl group, an alkynyl group, an aryl group, a heterocyclic ring group, a halogen atom, and a cyano group. These groups may have a substituent.

(Compounds Represented by Formula (4))

In above Formula (4), $R_{21}$ and $R_{22}$ are as defined for $R_{21}$ and $R_{22}$ in above Formula (2).

$Z_{21}$ is as defined for $Z_{21}$ in above Formula (2).

$A_{21}$ and $A_{22}$ are as defined for $A_{21}$ and $A_{22}$ in above Formula (2).

$B_{21}$ is as defined for $B_{21}$ in above Formula (2).

$X_{21}$ is as defined for $X_{21}$ in above Formula (2).

"n" is as defined for "n" in above Formula (2).

$Z_{42}$ represents O, S, N—$R_4$, Se or Te, wherein $R_4$ represents an-alkyl group or an aryl group. Of these preferred is O, S, or N—$R_4$, while more preferred is O or S.

$A_{43}$ and $A_{44}$ each independently represent a hydrogen atom or a substituent, which includes an alkyl group, a cycloalkyl group, an alkenyl group, an alkynyl group, an aryl group, a heterocyclic ring group, a halogen atom, and a cyano group. These groups may have a substituent.

(Compounds Represented by Formula (5))

In above Formula (5), $R_{11}$ and $R_{12}$ are as defined for $R_{11}$ and $R_{12}$ in above Formula (1).

$Z_{11}$ is as defined for $Z_{11}$ in above Formula (1).

$A_{11}$ and $A_{12}$ are as defined for $A_{11}$ and $A_{12}$ in above Formula (1).

$Z_{32}$ is as defined for $Z_{32}$ in above Formula (3).

$A_{53}$ and $A_{54}$ each independently represent a substituent, which includes an alkyl group, a cycloalkyl group, an alkenyl group, an alkynyl group, an aryl group, a heterocyclic ring group, a halogen atom, and a cyano group. These groups may have a substituent, but $A_{53}$ and $A_{54}$ do not represent the same substituent.

(Compounds Represented by Formula (6))

In above Formula (6), $R_{21}$ and $R_{22}$ are as defined for $R_{21}$ and $R_{22}$ in above Formula (2).

$Z_{21}$ is as defined for $Z_{21}$ in above Formula (2).

$A_{21}$ and $A_{22}$ are as defined for $A_{21}$ and $A_{22}$ in above Formula (2).

$B_{21}$ is as defined for $B_{21}$ in above Formula (2).

$X_{21}$ is as defined for $X_{21}$ in above Formula (2).

"n" is as defined for n in above Formula (2).

$Z_{42}$ is as defined for $Z_{42}$ in above Formula (4).

$A_{63}$ and $A_{64}$ each independently represent a substituent, which includes an alkyl group, a cycloalkyl group, an alkenyl group, an alkynyl group, an aryl group, a heterocyclic ring group, a halogen atom, or a cyano group. These groups may have a substituent, but $A_{63}$ and $A_{64}$ do not represent the same substituent.

(Compounds Represented by Formula (7))

In above Formula (7), $R_{11}$ and $R_{12}$ are as defined for $R_{11}$ and $R_{12}$ in above Formula (1).

$A_{11}$ and $A_{12}$ are as defined for $A_{11}$ and $A_{12}$ in above Formula (1).

$A_{53}$ and $A_{54}$ are as defined for $A_{53}$ and $A_{54}$ in above Formula (5).

(Compounds Represented by Formula (8))

In above Formula (8), $R_{21}$ and $R_{22}$ are as defined for $R_{21}$ and $R_{22}$ in above Formula (2).

$A_{21}$ and $A_{22}$ are as defined for $A_{21}$ and $A_{22}$ in above Formula (2).

$B_{21}$ is as defined for $B_{21}$ in above in above Formula (2).

$X_{21}$ is as defined for $X_{21}$ in above in above Formula (2).

"n" is as defined for "n" in above Formula (2).

$A_{63}$ and $A_{64}$ are as defined for $A_{63}$ and $A_{64}$ in above Formula (6).

(Compounds Represented by Formula (9))

In order to decrease an amount of absorption between 400 and 700 nm, the compound represented by Formula (7) is preferably further represented by Formula (9).

In Formula (9), $R_{11}$ and $R_{12}$ in Formula are each respectively the same as $R_{11}$ and $R_{12}$ in Formula (1), and preferably, $R_{11}$ and $R_{12}$ area hydrogen atom.

$X_1$ and $X_2$ are each independently a halogen atom. $X_1$ and $X_2$ are preferably Cl or Br, and more preferably they are Cl.

$R_{31}$ is an alkyl group. Listed examples of alkyl groups are: methyl group, ethyl group, n-propyl group, t-butyl group, n-octyl group, t-amyl group, 2-ethylhexyl group, 2-chloroethyl group, 3,3,3-trifluoropropyl group, 6-cyanohexyl group, cyclohexyl group, and 4-trifluoromethylcyclohexyl group. Preferably it is t-butyl group. Further, 2-alkoxy-1,1-dimethylethyl group (a derivative of t-butyl having an alkoxy group at 2 position) is more preferred. Listed examples of alkoxy groups are: methoxy group, ethoxy group, butoxy group, isobutoxy group and 2-ethylhexyloxy group. Among them, isobutoxy group and 2-ethylhexyl group are preferred.

Specific examples represented by Formulas (1)–(9) are shown below, however, the present invention is not limited thereto.

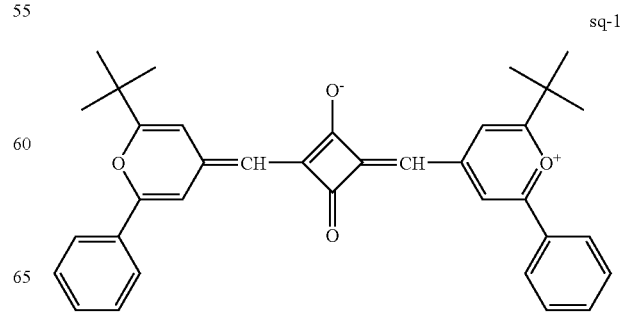

sq-1

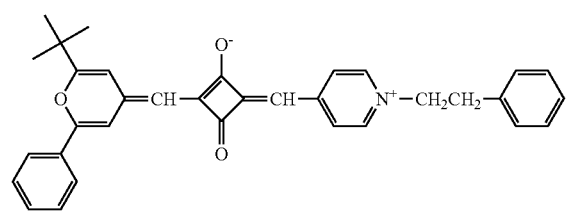
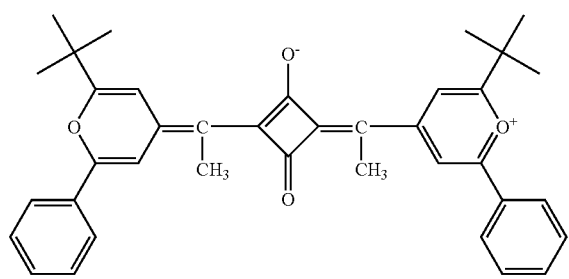
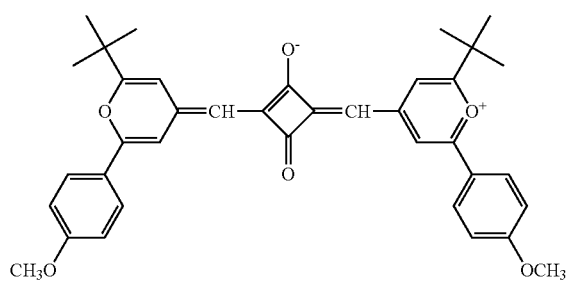
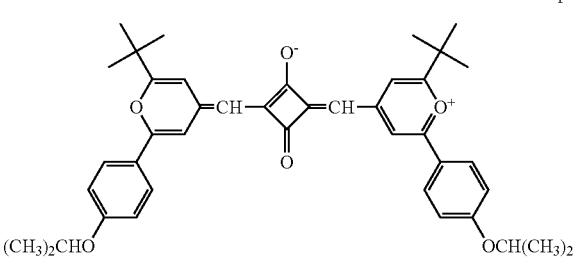
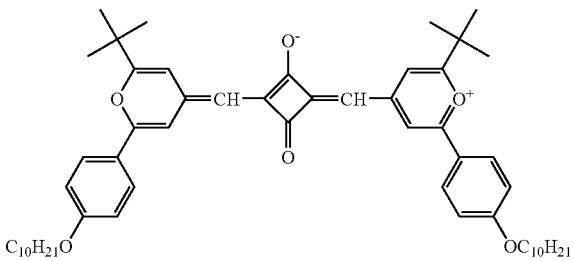
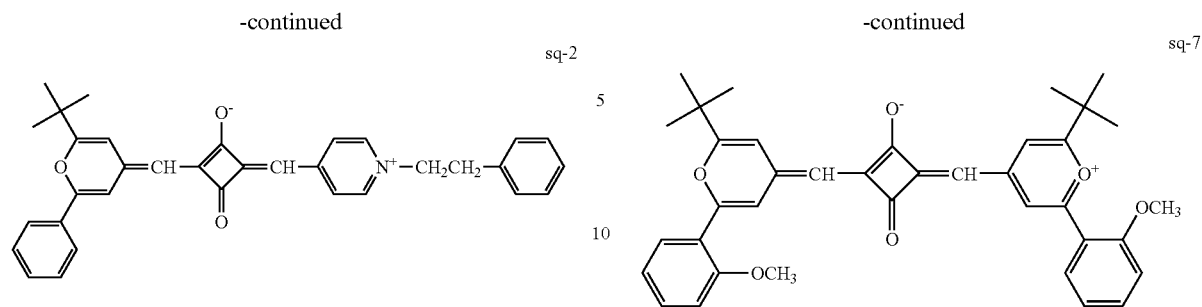
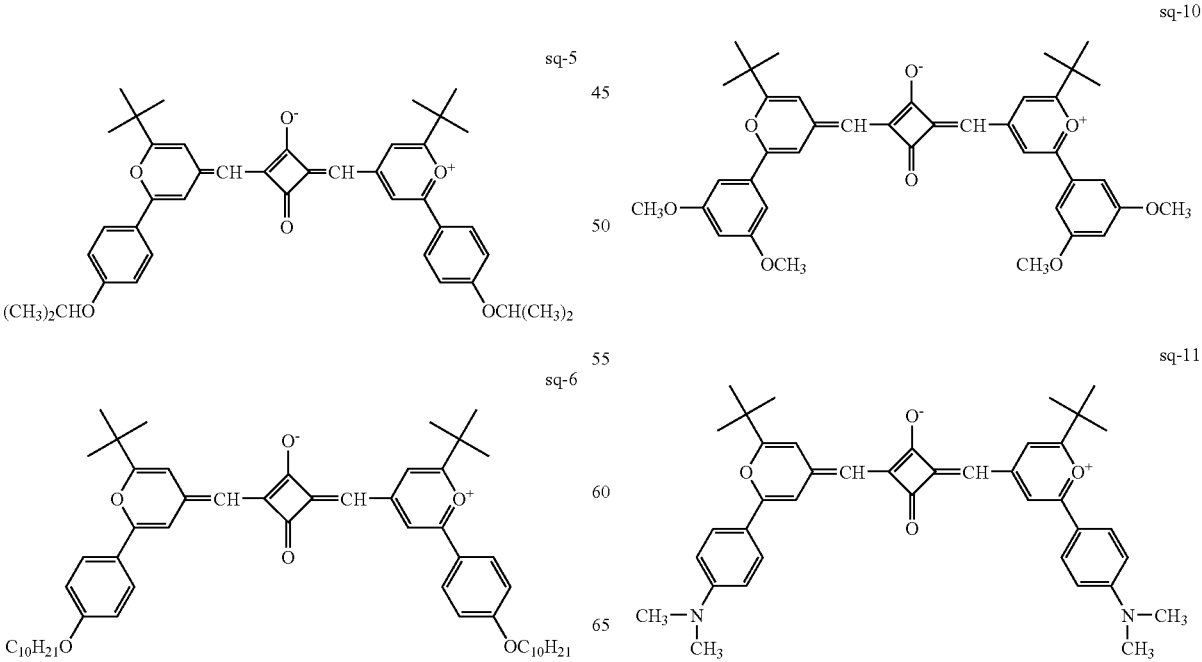

-continued
sq-12
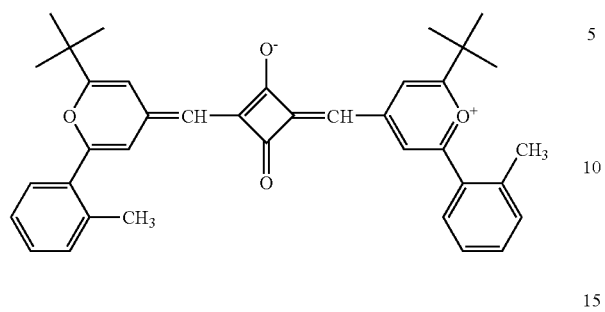
sq-17
sq-13
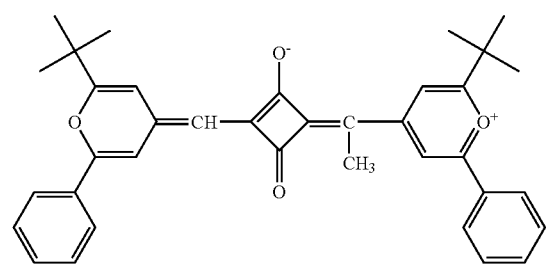
sq-18
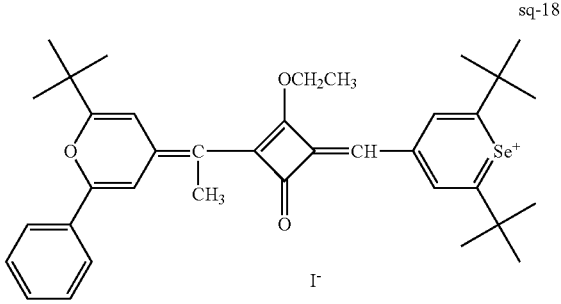
sq-14
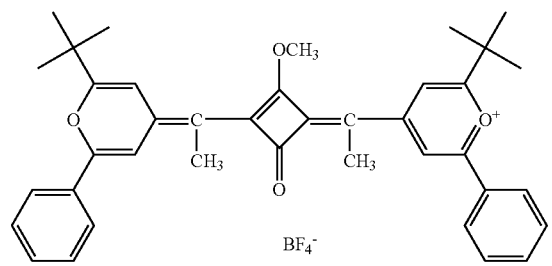
sq-19
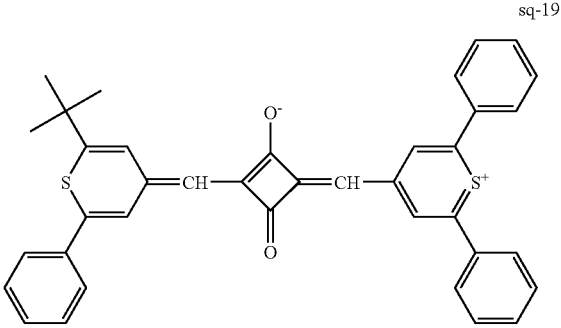
sq-15
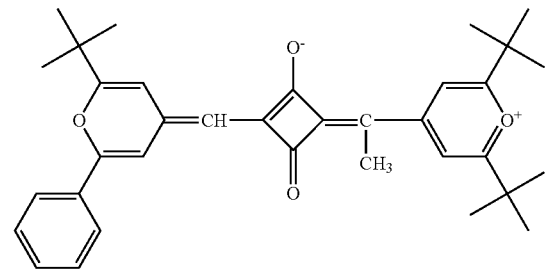
sq-20
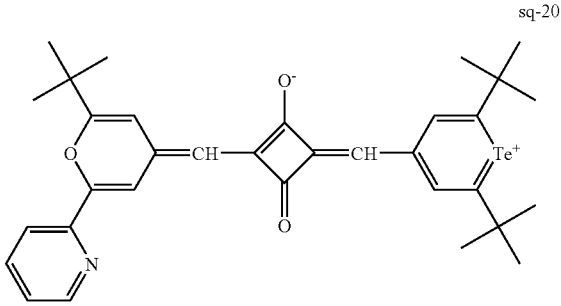
sq-16
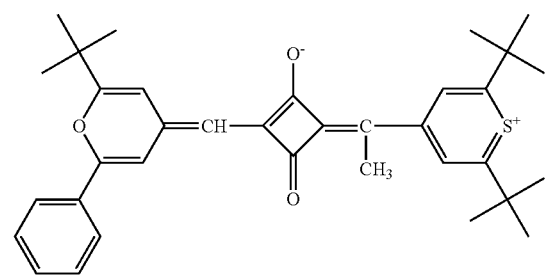
sq-21
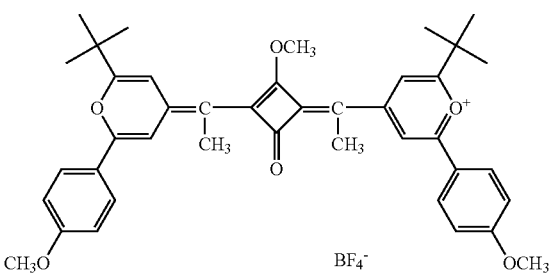

-continued
sq-22
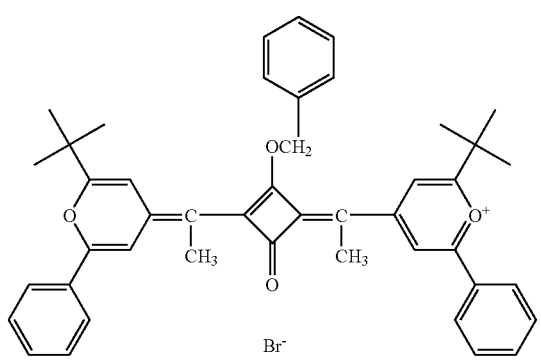
sq-23
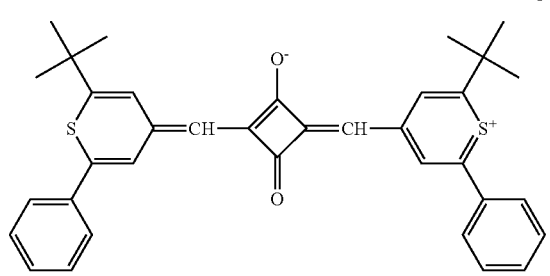
sq-24
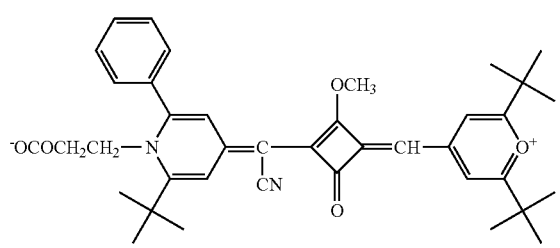
sq-25
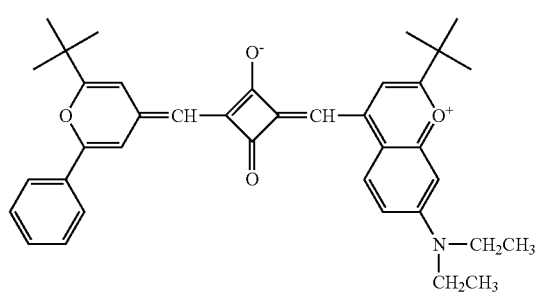
sq-26
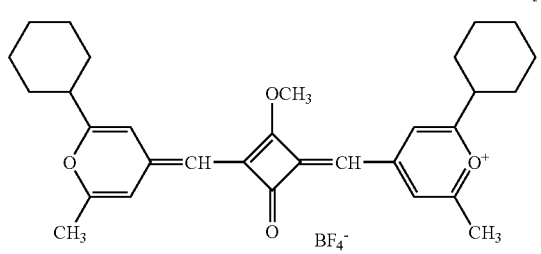
-continued
sq-27
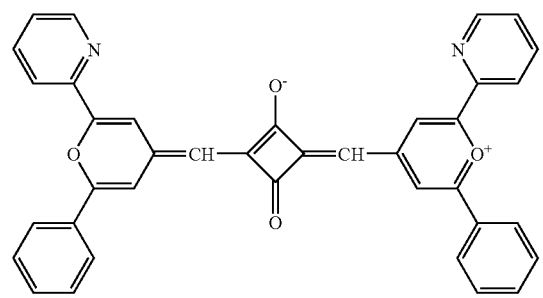
sq-28
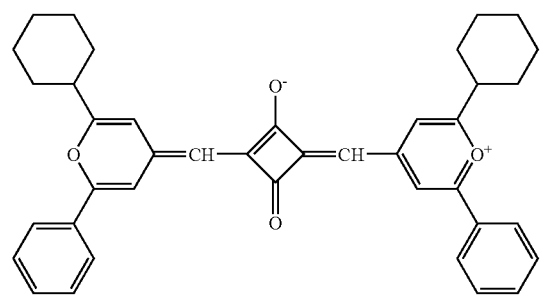
sq-29
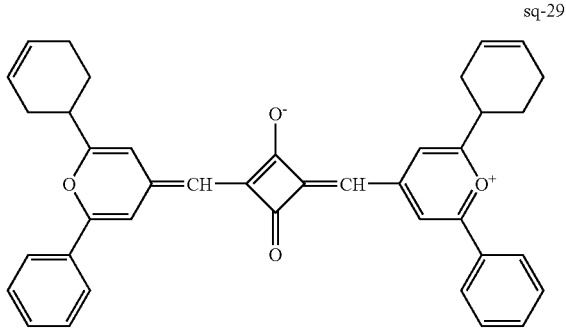
sq-30
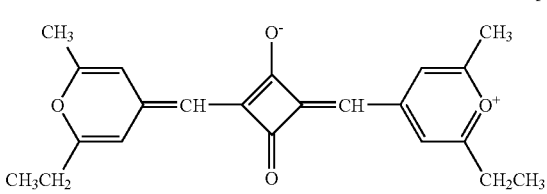
sq-31
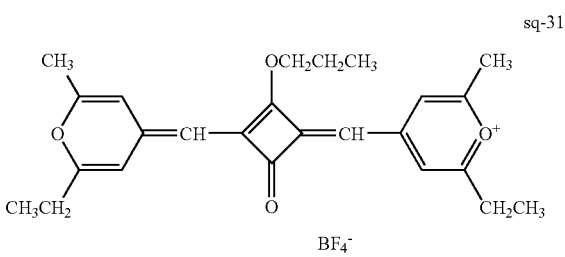

sq-32
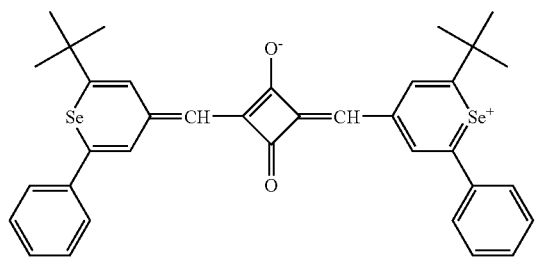
sq-37
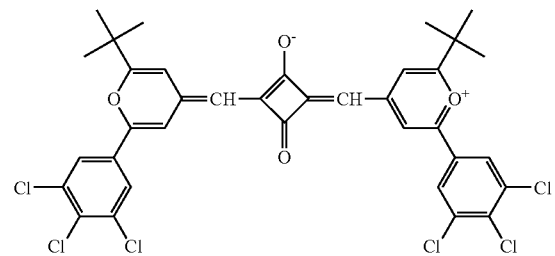
sq-33
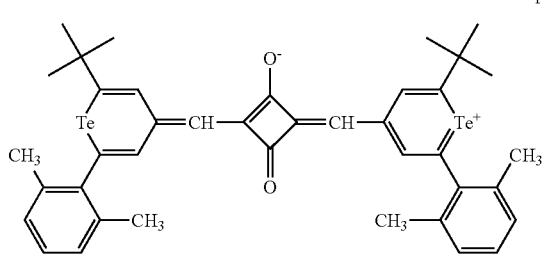
sq-38
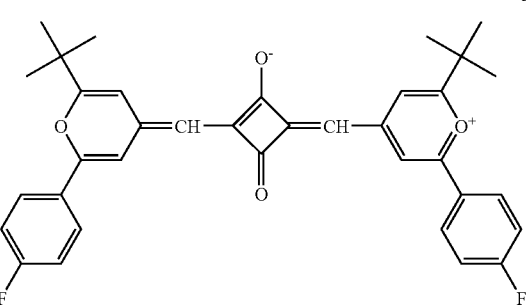
sq-34
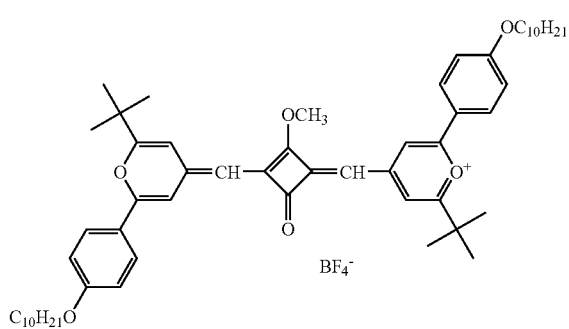
sq-39
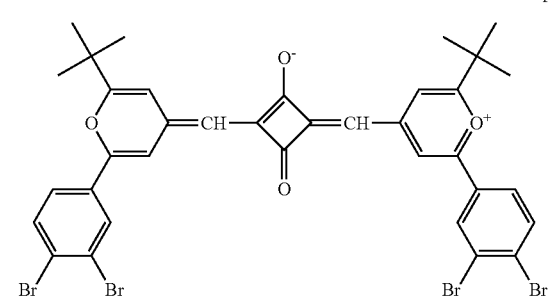
sq-35
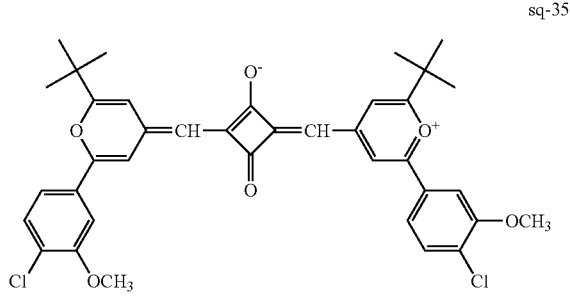
sq-40
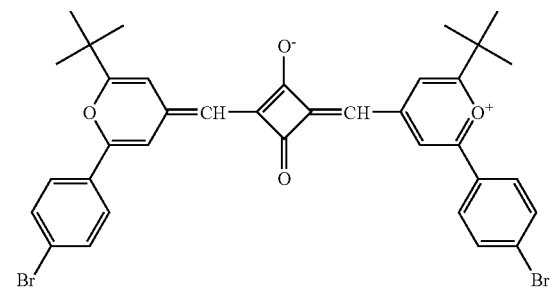
sq-36
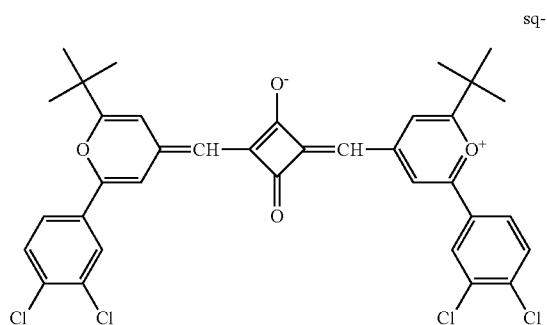
sq-41
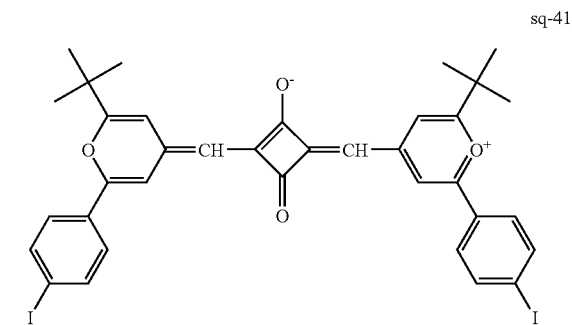

-continued
sq-42
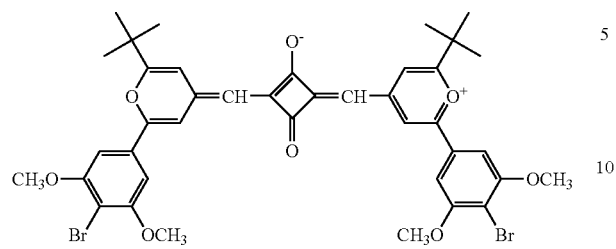
sq-46
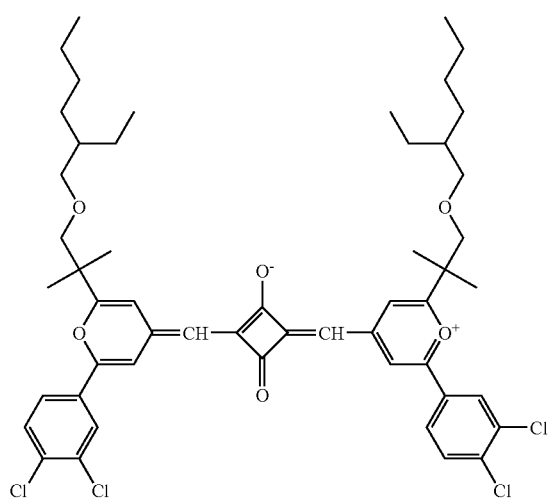
sq-43
sq-47
sq-44
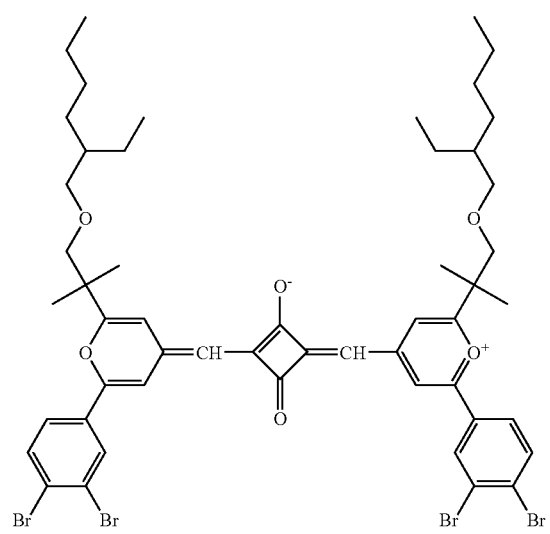
sq-48
sq-45
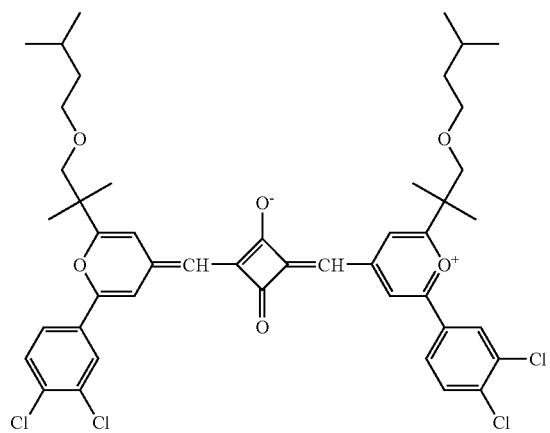

-continued sq-49

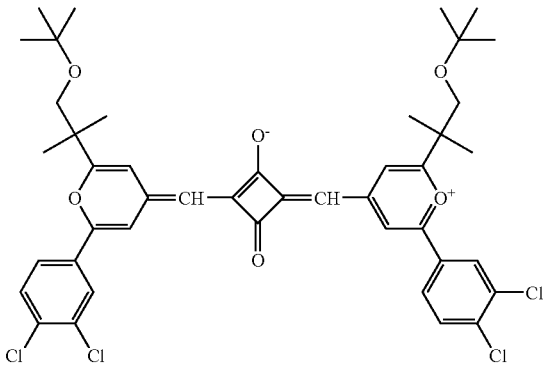

sq-50

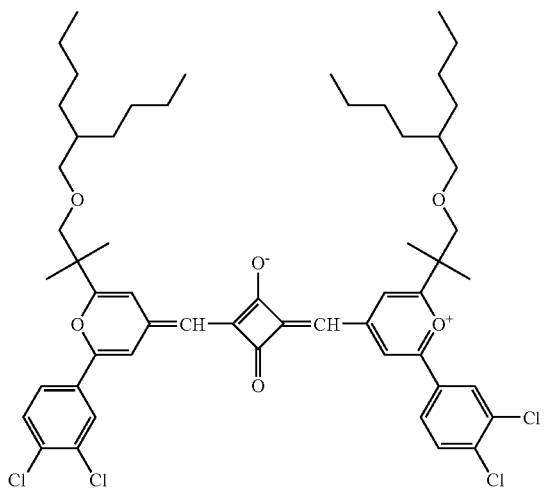

The compounds represented by Formulas (1)–(9) may be incorporated in any layer of heat developable photosensitive materials. However, the above compounds are incorporated preferably in a photosensitive layer, a non-photosensitive layer on the photosensitive layer side with respect to the support, or a filter layer formed on the opposite side of the photosensitive layer, but more preferably in a non-photosensitive layer on the photosensitive layer side with respect to the support or a filter layer formed on the side opposite the photosensitive layer. The added amount of the compounds represented by Formulas (1)–(9) is preferably $1 \times 10^{-5}$–10 millimol per m$^2$, is more preferably $1 \times 10^{-4}$–1 millimol, but is most preferably $1 \times 10^{-3}$–$1 \times 10^{-1}$ millimol.

It is possible to add the compounds represented by Formulas (1)–(8) employing the methods known in the art. Namely, it is possible to add the above compounds to a liquid coating composition upon being dissolved in alcohols such as methanol or ethanol, ketones such as methyl ethyl ketone or acetone, or polar solvents such as dimethylsulfoxide or dimethylformamide. Further, it is possibly to add them to a liquid coating composition upon being dispersed into water or organic solvents to form minute particles at a size of at most 1 μm. Many techniques are disclosed for dispersion of minute particles, and it is possible to perform dispersion based on any appropriate ones of these techniques.

(Heat Developable Photosensitive Materials)

The heat developable photosensitive materials of the present invention will now be described.

(Organic Silver Salts)

In the present invention, it is preferable to employ organic silver salts. The organic silver salts employed in the present invention function as a reducible silver source and are organic acids incorporating reducible silver ion sources. Organic acids include aliphatic carboxylic acids, carbocyclic carboxylic acids, and heterocyclic ring compounds. Of these, preferably employed are aliphatic carboxylic acids, particularly having a long chain (of 10–30 carbon atoms, or preferably 15–25 carbon atoms) and heterocyclic ring carboxylic acids having a nitrogen-containing heterocyclic ring. In addition, useful are organic silver salt complexes in which the ligand exhibits a general stability constant to silver ions of 4.0–10.0.

Examples of such organic acid silver salts are described in Research Disclosure (hereinafter referred to as RD) Nos. 17029 and 29963. Of these, preferably employed are aliphatic acid silver salts and particularly preferably employed are silver behenate, silver arachidiate, and silver stearate.

The aforesaid organic silver compounds are prepared by mixing water-soluble silver compounds with compounds which form complexes with silver. Preferably employed as mixing methods are a normal mixing method, a reverse mixing method, and a double-jet method. Further, it is possible to employ the controlled double-jet method described in JAS-A No. 9-127643.

In the present invention, it is preferable that organic silver salts are composed of particles at an average diameter of at most 1 μm and are monodispersed. Average particle diameter of organic silver salts, as described herein, refers to the following diameter. When organic silver salt particles are, for example, spherical, rod-shaped, or tabular, the average diameter refers to the diameter of a sphere having the same volume as those described above. The average particle diameter is preferably 0.01–0.8 μm, but is particularly preferably 0.05–0.5 μm. Further, monodispersion is as defined for silver halide described below, and monodispersibility is preferably 1–30 percent. In the present invention, it is more preferable that organic silver salts are composed of monodispersed particles at an average particle diameter of at most 1 μm. By controlling the particles to the above range, it is possible to prepare images which exhibit relatively high density. In addition, it is preferable that in the organic silver salts, the number of tabular particles occupy at least 60 percent with respect to the entire organic silver. Tabular particles, as described in the present invention, refer to those of a ratio of the average particle diameter to the thickness, namely an aspect ratio (hereinafter referred to as AR) represented by the formulae below of at least 3.

AR=average particle diameter (μm)/thickness (μm)

It is preferable that such organic silver particles are prepared in such a manner that after performing preliminary dispersion, if desired, together with binders and surface active agents, the resulting dispersion is dispersed and crushed employing a media homogenizer or a high pressure homogenizer. Employed as homogenizers for the above preliminary dispersion may, for example, be common stirrers such as an anchor type or a propeller type, a high speed revolving centrifugal radial type stirrer (a dissolver), or a high speed shearing type stirrer (a homomixer). Further, listed as the aforesaid media homogenizers are, for example, tumbling mills such as a ball mill, a planetary ball mill, or a vibration ball mill, media stirring mills such as a bead mill or an attritor, and others such as a basket mill. Employed as high pressure homogenizers may be various types such as a type in which collision is made against walls and plugs, a type in which after dividing a liquid composition into a plurality of flows, the liquid compositions are made to collide into each other at a high rate, or a type in which a liquid composition is passed through narrow orifices.

In devices which are employed while dispersing organic silver particles used in the present invention, it is preferable to use ceramics such as zirconia, alumina, silicon nitride, boron nitride, or diamond as a material of members which come into contact with the organic silver particles. Of these, it is particularly preferred to use zirconia (Zr).

It is also preferable that organic silver particles incorporate Zr in an amount of 0.01–0.5 mg per g of silver. Cases are particularly preferred in which Zr is incorporated in an amount of 0.01–0.3 mg. When the above dispersion is carried out, optimizing the binder concentration, the preliminary dispersion method, the homogenizer operating conditions, and the frequency of dispersion is particularly preferred as a method to prepare the organic silver particles employed in the present invention.

(Photosensitive Silver Halide)

In order to minimize milkiness (or white turbidity) as well as coloration (yellowing) after image formation and to obtain excellent image quality, the average grain diameter of the silver halide grains, employed in the present invention, is preferably rather small. The average grain diameter is preferably less than 0.1 μm, more preferably between 0.01 and 0.1 μm, and still more preferably between 0.02 and 0.08 μm.

Incidentally, grain diameter, as described herein, refers to the edge length of silver halide grains which are so-called regular crystals such as a cube or an octahedron. Further, when silver halide gains are planar, the grain diameter refers to the diameter of the circle which has the same area as the projection area of the main surface.

In the present invention, silver halide grains are preferably in a state of monodispersion. Monodispersion, as described herein, means that the variation coefficient, obtained by the formula described below, is less than or equal to 30 percent. The aforesaid variation coefficient is preferably less than or equal to 20 percent, and is more preferably less than or equal to 15 percent.

Variation coefficient (in percent) of grain diameter=standard deviation of grain diameter/average of grain diameter×100

The crystal habit of the external surface of silver halide grains is not particularly limited. However, it is preferable that the ratio of the surface having a Miller index of (100) on the external surface of silver halide grains is high. The ratio is preferably at least 5.0 percent, is more preferably at least 70 percent, and is most preferably at least 80 percent. Incidentally, it is, possible to obtain a ratio of the surface having a Miller index of (100), based on T. Tani, J. Imaging Sci., 29, 165 (1985), utilizing adsorption dependence of sensitizing dye in-a (111) plane as well as a (100) surface.

Further, in the present invention, another preferred form of photosensitive silver halide is of tabular particles. Tabular particles, as described herein, refer to those in which the aspect ratio (r/h) is at least 3, wherein r represents particle diameter (in μm) which is the square root of the projective area of a particle and h represents the thickness in the perpendicular direction. Particles of an aspect ratio of 3–50 are preferred. Further, the diameter of tabular particles is preferably at most 0.1 μm, but is more preferably 0.01–0.08 μm. These tabular particles are. described in U.S. Pat. Nos. 5,264,337, 5,314,798, and 5,320,958, and it is possible to easily prepare the targeted tabular particles.

Halogen compositions are not particularly limited. Any of silver chloride, silver chlorobromide, silver chloroiodobromide, silver bromide, silver iodobromide, or silver iodide may be employed.

Silver halide grains employed in the present invention can be prepared in the form of silver halide grain emulsions, employing methods described in P. Glafkides; "Chimie et Physique Photographiques" (published by Paul Montel Co., 1967), G. F. Duffin, "Photographic Emulsion Chemistry". (published by The Focal Press, 1955), and V. L. Zelikman et al., "Making and Coating Photographic Emulsion", published by The Focal Press, 1964).

It is preferable to incorporate ions of transition metals which belong to Groups 6 through 11 in the Periodic Table in silver halide grains employed in the present invention. Preferred as aforesaid transition metals are W, Fe, Co, Ni, Cu, Ru, Rh, Pd, Re, Os, Ir, Pt and Au.

The above-described metal ions can be added in silver halide grains as a metal complex or metal complex ions. In the present invention, preferred as a metal complex or complex ions are those represented by the formula described below.

$$[ML_6]^m$$ Formula:

wherein M represents a transition metal selected from the elements of Groups 6 through 11 in the Periodic Table; L represents a ligand; and m represents 0, -, 2-, 3-, or 4-. Listed as specific examples of ligands represented by L are a halogen ion (a fluoride ion, a chloride ion, a bromide ion, or an iodide ion), a cyanide, a cyanate, a thiocyanate, a selenocyanate, a tellurocyanate, an azide, and an aqua ligand, and nitrosyl and thionittosyl. Of these, aqua, nitrosyl, and thionitrosyl are preferred. When the aqua ligand is present, one or two ligands are preferably occupied by the aqua ligand. L may be the same or different.

M is preferably selected from Rh, Ru, Re, Ir and Os. Listed examples containing transition metal complex ions are: $[RhCl_6]^{3-}$, $[RuCl_6]^{3-}$, $[ReCl_6]^{3-}$, $[RuBr_6]^{3-}$, $[OsCl_6]^{3-}$, $[IrCl_6]^{4-}$, $[Ru(NO)Cl_5]^{2-}$, $[RuBr_4(H_2O)]^{2-}$, $[Ru(NO)(H_2O)Cl_4]^-$, $[RhCl_5(H_2O)]^{2-}$, $[Re(NO)Cl_5]^{2-}$, $[Re(NO)(CN)_5]^{2-}$, $[Re(NO)Cl(CN)_4]^{2-}$, $[Rh(NO)_2Cl_4]^-$, $[Rh(NO)(H_2O)Cl_4]^-$, $[Ru(NO)(CN)_5]^{2-}$, $[Fe(CN)_6]^{3-}$, $[Rh(NS)Cl_5]^{2-}$, $[Os(NO)Cl_5]^{2-}$, $[Cr(NO)Cl_5]^{2-}$, $[Re(NO)Cl_5]^-$, $[Os(NS)Cl_4(TeCN)]^{2-}$, $[Ru(NS)Cl_5]^{2-}$, $[Re(NS)Cl_4(SeCN)]^{2-}$, $[Os(NS)Cl(SCN)_4]^{2-}$, $[Ir(NO)Cl_5]^{2-}$ and $[Ir(NS)Cl_5]^{2-}$.

The above-described metal ions, metal complexes, or metal complex ions may be used solely or in combination of two or more. Metal atoms may be the same or different.

The content ratio of dopants is preferably in the range of $1\times10^{-9}$ to $1\times10^{-2}$ mol per mol of silver, and is more preferably $1\times10^{-86}$ to $1\times10^{-4}$ mol.

It is preferable that compounds, which provide ions of these metals or complex ions, are added during formation of silver halide grains so as to be incorporated in the silver halide grains. The compounds may be added at any stage of, prior to or after, silver halide grain preparation, namely nuclei formation, grain growth, physical ripening or chemical ripening. However, they are preferably added at the stage of nuclei formation, grain growth, physical ripening, are more preferably added at the stage of nuclei formation and growth, and are most preferably added at the stage of nuclei formation.

They may be added over several times upon dividing them into several portions. Further, they may be uniformly incorporated in the interior of silver halide grains. Still further, as described in JP-A Nos. 63-29603, 2-306236, 3-167545, 4-76534, 6-110146, and 5-273683, they may be incorporated so as to result in a desired distribution in the interior of the grains.

These metal compounds may be dissolved in water or suitable organic solvents (for example, alcohols, ethers, glycols, ketones, esters, and amides) and then added. Further, addition methods include, for example, a method in which either an aqueous solution of metal compound powder or an aqueous solution prepared by dissolving metal compounds together with NaCl and KCl is added to a water-soluble halide solution, a method in which silver halide grains are formed by a silver salt solution, and a halide solution together with a the compound solution as a third aqueous solution employing a triple-jet precipitation method, a method in which, during grain formation, an aqueous metal compound solution in a necessary amount is charged into a reaction vessel, or a method in which, during preparation of silver halide, other silver halide grains which have been doped with metal ions or complex ions are added and dissolved. Specifically, a method is preferred in which either an aqueous solution of metal compound powder or an aqueous solution prepared by dissolving metal compounds together with NaCl and KCl is added to a water-soluble halide solution. When added onto the grain surface, an aqueous metal compound solution in a necessary amount may be added to a reaction vessel immediately after grain formation, during or after physical ripening, or during chemical ripening.

Incidentally, it is possible to introduce non-metallic dopants into the interior of silver halide employing the same method as the metallic dopants.

The separately prepared photosensitive silver halide particles are subjected to washing and desalting employing desalting methods known in the photographic art, such as a noodle method, a flocculation method.

(Chemical Sensitization)

It is preferable that silver halide grains employed in the present invention are subjected to chemical sensitization. Employed as preferred chemical sensitizing methods are a sulfur sensitization method, a selenium sensitization method, and a tellurium sensitization method, each of which is well known in this industry. In addition, it is possible to employ a noble metal sensitization method using gold, platinum, palladium or iridium compounds, as well as a reduction sensitization method.

Preferably employed as compounds for the sulfur sensitization method, selenium sensitization method, or tellurium sensitization method may be those known in the art. It is possible to employ the compounds, for example, described in JP-A No. 7-128768. Employed as tellurium sensitizers may, for example, be diacyl tellurides, bis(oxycarbonyl) tellurides, bis(carbamoyl9tellurides, diacyl tellurides, bis(oxycarbonyl)ditellurides, bis(carbamoyl)ditellurides, compounds having a P=Te bond, tellurocarboaylic acid salts, Te-organyltellurocarboxylic acid esters, di(poly)tellurides, tellurides, tellurols, telluroacetals, tellurophosphonates, compounds having a P—Te bond, Te-containing heterocycles, tellurocarbonyl compounds, inorganic tellurium compounds, and colloidal tellurium.

Listed as compounds preferably employed in the noble metal sensitization method are, for example, chloroauric acid, potassium chloroaurate, potassium aurothiocyanate, gold sulfide, and gold selenide, as well as the compounds described in U.S. Pat. No. 2,448,060 and British Patent No. 618,061.

Listed as compounds employed in the reduction sensitization method are, for example, ascorbic acid and thiourea dioxide, as well as others such as stannous chloride, aminoiminomethanesulfinic acid, hydrazine derivatives, boron compounds, silane compounds, or polyamine compounds. Further, it is possible to perform reduction sensitization by maintaining the pAg of silver halide emulsions in the range of 7–8.3. Further, it is also possible to perform reduction sensitization by introducing a single addition portion of silver ions during grain formation.

(Reducing Agents)

It is preferable to incorporate reducing agents in the heat developable photosensitive materials of the present invention. Listed as reducing agents are those which are commonly known. Listed as examples may be phenols, polyphenols having at least two phenol groups, naphthols, bisnaphthols, polyhydroxybenzenes having at least two hydroxyl groups, polyhyrdoxynaphthalens having at least two hydroxyl groups, ascorbic acids, 3-pyrazolidones, pyrazolidone-5-ones, pyrazolines, phenylenediamines, hydroxylamines, hydroquinone monoethers, hydroxamic acids, hydrazides, amidoximes, and N-hydroxyureas. In more detail, listed may be reducing agents which are specifically described in U.S. Pat. Nos. 3,615,533, 3,679,426, 3,672,904, 3,751,252, 3,782,949, 3,801,321, 3,794,488, 3,893,863, 3,887,376, 3,770,448, 3,819,382, 3,773,512, 3,839,048, 3,887,378, 4,009,039, and 4,021,240; British Pat. No. 1,486,148; Belgian Pat. No. 786,086; JP-A Nos. 50-36143, 50-36110, 50-116023, 50-99719, 50-140113, 51-51933, 51-23721, and 52-84727; and Japanese Patent Publication No. 51-35851. It is allowable to select suitable reducing agents from the prior art agents listed above and to use any of them in the present invention. The most effective method to confirm the suitability of reducing agents is that a heat developable photosensitive material incorporating reducing agents is practically prepared and the resulting photographic performance is directly evaluated.

Of the above reducing agents, listed as preferred reducing agents, in cases in which aliphatic carboxylic acid silver salts are employed as an organic silver salt, may be polyphenols in which at least two phenols groups are bonded via an alkylene group or sulfur, especially polyphenols in which at least two phenol groups, in which an alkyl group (for example, a methyl group, an ethyl group, a propyl group, a t-butyl group, or a cyclohexyl group) or an acyl group (for example, an acetyl group, or a propionyl group) is substituted to at least one position adjacent to the hydroxyl substitution position, are bonded via an alkylene group or sulfur. Examples include polyphenols such as 1,1-bis(2-hydroxy-3,5-dimethylphenyl)-3,5,5-trimethylhexane, 1,1-bis(2-hydroxy-3-t-butyl-5-methylphenyl)methane, 1,1-bis(2-hydroxy-3,5-di-butylphenyl)methane, (2-hydroxy-3-t-butyl-methylphenyl)-(2-hydroxy-5-methylphenyl)methane, 6,6'-benzylidene-bis(2-t-butyl-4-methylphenol), 6.6'-benzylidene-bis(2,4-dimethylphenol), 1,1-bis(2-hydroxy-3,5-dimethylphenyl)-2-methylpropane, 1,1,5,5-tetrakis(2-hydroxy-3,5-dimethylphenyl)-2,4-ethylpentane, 2,2-bis(4-hydroxy-3,5-dimethylphenyl)propane, 2,2-bis(4-hydroxy-3,5-di-t-butylphenyl)propane, which are described in U.S. Pat. Nos. 3,589,903 and 4,021,249, British Pat. No. 1,486,148, JP-A Nos. 51-51933, 50-36110, 50-116023, and 52-84727, Japanese Patent Publication No. 51-35727; bisnaphthols such as 2,27-dihydroxy-1,1'-binaphthyl, 6,6'-dibromo-2,2'- dihydroxy-1,1'-binaphthyl, 6,6'-dinitro-2,2'-dihydroxy-1,1'-binaphthyl, bis(2-hydroxy-1-naphthyl)methane, and 4,4'-dimethoxy-1,1'dihydroxy-2,2'-binaphthyl, described in U.S. Pat. No. 3,672,904; sulfonamidophenols or sulfonamidonaphthols such as 4-venzenesulfonamidophenol, 2-benzenesuldonamidophenol, 2,6-dichloro-4-benzenesulfonamidophenol, or 4-benzenesulfonamidonaphthol, described in U.S. Pat. No. 3,801,321; and polyphenols compounds described in JP-A Nos. 2003-302723 and 2003-315954. Particularly preferred are polyphenol compounds described in JP-A Nos. 2003-302723 and 2003-315954.

The amount of reducing agent employed in the heat developable photosensitive materials of the present invention varies depending on the type of employed organic silver salts and reducing agents, and other additives. However, the amount is commonly in the range of 0.05–10 mol per mol of the organic silver salts, but is preferably in the range of 0.1–5 mol. Further, in the above range, the aforesaid reducing agents may be employed in combination of at least two types. In the present invention, it is preferable that in order to minimize variation of photographic performance due to the standing period of the photosensitive layer liquid composition, the aforesaid reducing agents are added to the above coating composition just prior to coating.

Constituting elements of the heat developable photosensitive material of the present invention, other than the items described above, will now be described.

The heat developable photosensitive material of the present invention is constituted in such a manner that a photosensitive layer incorporating aforesaid organic silver salts, photosensitive silver halide, and reducing agents, as well as a protective layer are applied onto a support in the above order. Further, a heat developable photosensitive material is also preferred in which, if desired, an interlayer is provided between the support and the above photosensitive layer.

Further, also preferably employed is a heat developable photosensitive material in which a back coat layer is provided on the surface opposite the photosensitive layer to ensure conveying properties and minimize blocking with the protective layer. Incidentally, each layer may be composed of a single layer or a plurality of at least two layers in which the compositions are same or different.

(Binders)

Further, in the present invention, binder resins are preferably employed to form each of the above layers. As the above resins, it is possible to appropriately select transparent or translucent resins which have been employed and then employed. Listed as such resins are, for example, polyvinyl acetal based resins such as polyvinyl formal, polyvinyl acetacetal, or polyvinyl butyral; cellulose based resins such as ethyl cellulose, hydroxyethyl cellulose, or cellulose acetate butyrate; styrene based resins such as polystyrene, styrene-acrylonitrile copolymers, or styrene-acrylonitrile-acryl rubber copolymers; vinyl chloride based resins such as polyvinyl chloride or chlorinated polypropylene; as well as polyester, polyurethane, polycarbonate, polyallylate, epoxy resins, and acrylic resins. These may be employed singly or in combination of at least two types.

Incidentally, as long as the purposes of the present invention are not adversely affected, it is possible appropriately select and employ the above binder resins in each of the protective layer, and interlayer, as well as the back coat layer which is provided if necessary. Incidentally, in an interlayer or a back coat layer, it may used as layer forming binder resins may be epoxy resins or acryl monomers capable of being cured via exposure to actinic radiation. In the present invention, preferably employed are the water based binders described below.

Employed as preferred water based binder resins may be water-soluble polymers or water dispersible hydrophobic polymers (latexes). Examples include polyvinylidene chloride, vinylidene chloride-acrylic acid copolymers, vinylidene chloride-itaconic acid copolymers, sodium polyacrylate, polyethylene oxide, acrylic acid amide-acrylic acid ester copolymers, styrene-maleic anhydride copolymers, acrylonitrile-butadiene copolymers, vinyl chloride-vinyl acetate copolymers, and styrene-butadiene-acrylic acid copolymers. These form aqueous coating compositions and also form a uniform resinous layer during the stage in which a coating layer is formed via drying after coating. These are employed as follows. Organic silver salts, silver halide, and reducing agents are converted to an aqueous dispersion. The resulting aqueous dispersion is blended with the above latex to form a uniform dispersion. Thereafter, the resulting dispersion is applied onto a support, whereby it is possible to prepare a photosensitive layer. Latex particles are fused upon being heated, whereby a uniform layer is formed. Further, polymers at a glass transition point of –20 to 80° C. are preferred, but those at a glass transition point of –5 to 60° C. are particularly preferred. As the glass transition point rises, the required heat development temperature increases, while as the heat development temperature also rises, fogging tends to occur, resulting a decrease in photographic speed and contrast. It is preferable that the aqueous dispersion polymer is dispersed so that the minute particles at an average diameter in the range of 1 nm—several μm are formed. The water dispersible hydrophobic polymers are known as latexes and are widely employed as a binder of water based coatings. Of these, are preferred latexes which enhance water resistance. The used amount of latexes to achieve water resistance is determined taking into account coating properties. In view of moisture resistance, the greater the amount, the more preferred. The latex ratio with respect to the entire amount of binders is preferably 50–100 percent by weight, but is particularly preferably 80–100 percent by weight.

In the present invention, it is preferable that the amount of these binder resins in terms of solids is 0.2–10 times as much as the coated silver amount. For example, in the case of the silver coated amount of 2.0 g/m$^2$, the polymer coated amount is preferably 0.5–20 g/m$^2$, but is more preferably 0.5–7 times as much as the silver coated amount. For example, when the silver coated amount is 2.0 g/m$^2$, the polymer coated amount is 1.0–14 g/m$^2$. When the amount of binder resins is at most 0.25 times as much as the coated silver amount, silver tone is markedly degraded to occasionally be commercially unviable, while if it is at least 10 times as much, the contrast is lowered to occasionally be commercially unviable.

Further, if desired, other than the aforesaid essential components added to the photosensitive layer according to the present invention may be antifoggants, toning agents, sensitizing dyes, materials resulting in supersensitization (hereinafter also referred to as supersensitizers), and binder resins.

In the present invention, antifoggants are selected from compounds, for example, disclosed in U.S. Pat. Nos. 3,874,946 and 4,756,999 such as heterocyclic compounds having at least one substituent represented by —C($X_1$)($X_2$)($X_3$) wherein each of $X_1$ and $X_2$ represents a halogen atom, while $X_3$ represents a hydrogen or halogen atom and the compounds disclosed in JP-A Nos. 9-288328 and 9-90550, U.S.

Pat. No. 5,028,523, European Pat. Nos. 600,587, 605,981, and 631,176, and then these antifoggants are employed.

(Toning Agents)

Listed as toning agents to improve the silver tone after development may, for example, be imides (for example, phthalimide); cyclic imides, pyrazoline-5-ones, quinazoline (for example, succinimide, 3-phenyl-2-pyrazoline-5-one, 1-phenylurazol, quinazoline, and 2,4-thiazolidione); napthalimides (for example, N-hydroxy-1,8-naphthalimide); cobalt complexes (for example, cobalt hexaminetrifluoroacetate); mercaptans (for example, 3-mercapto-1,2,4-triazole); N-(aminomethyl)aryldicarboxyimides (for example, N-(dimethylaminomethyl)phthalimide); blocked pyrazoles; combinations of isothiuronium derivatives with certain kinds of optical bleaching agents (for example, a combination of N,N'-hexamethylene(1-carbamoyl-3,5-dimethylpyrazole), 1,8-(3,6-dioxaoctane)bis isothiurpniumtrifluoroacatate), and 2-(tribromomethylsulfonyl)benzothiazole); merocyanine dyes (for example, 3-ethyl-5-((3-ethyl-2-benzothiazolynydene(benzothiazolinylidene))-1-methylethylidene)-2-thio-2,4-oxazolzinedione); phthalazinone, phthalazinone, phthalazinone derivatives, or metal salts of these derivatives (for example, 4-(1-naphthyl)phthalazinone, 6-chlorophthalazinone, 5,7-dimethyloxyphthalazinone, and 2,3-dihydro-1,4-phthalazinedione); combinations of phthalazinone and sulfinic acid derivatives (for example, 6-chlorophthalaxine and sodium benznesulfinate or 8-methylphthalazinone and sodium toluenesulfinate); combinations of Phthalazine and phthalic acid); combinations of phthalazine (including phthalazine addition products) with at least one compounds selected from the group consisting of maleic anhydride and phthalic acid, 2,3-naphthalene dicaboxylic acid or o-phenylenic acid derivatives and anhydrides thereof (for example, phthalic acid, 4-methylphthalic acid, 4-hitrophthalic acid, and tetrachlorophthalic anhydride); quinazolinediones, benzoxazine, and nartoxazine derivatives; benzoxazine-2,4-diones (for example, 1,3-benzoxazine-2,4-dione); pyrimidines and asymmetry-triazines (for example, 2,4-dihyroxypyrimidine) and tetraazapentalene derivatives (for example, 3,6-dimercapto-1,4-diphenyl-1H,4H-2,3a,5,6a-tetraazapentalene). Preferred toning agents are phthalazone and phthalazine. Further, toning agents may be incorporated into the protective layer, described below, in an amount which does not adversely affect the purposes of the present invention.

(Sensitizing Dyes)

Selected as Preferable sensitizing dyes are, for example, for argon ion laser beam sources, the simple merocyanines described in JP-A Nos. 60-162247 and 2-48635, U.S. Pat. No. 2,161,331, West German Pat. No. 936,071, and JP-A No. 5-11389; for helium neon laser beam sources, the trinuclear cyanine dyes described it JP-A Nos. 50-62425, 54-18726, and 59-102229, as well as the merocyanines described in JP-A No. 7-287338; for LED light sources and semiconductor laser beam sources, the thiacarbocyanins described in Japanese Patent Publication Nos. 48-42172, 51-9609, and 55-39818, as well as JP-A Nos. 62-284343 and 2-105135; and for infrared semiconductor laser beam sources, the tricarbocyanines described in JP-A Nos. 59-191032 and 60-80841 and dicarbocyanines described in JP-A No. 59-192242 and 4-quinoline nucleolus containing dicarbocyanines described in Formulas (IIIa) and (IIIb) of JP-A No. 3-67242. Further, in order to correspond to lasers of a beam source wavelength of at least 750 nm, or lasers having a longer wavelength, preferably at least 800 nm, preferably employed are the sensitizing dyes described in JP-A Nos. 4-182639, 5-341432, 6-52387, and 3-10931, U.S. Pat. No. 5,441,866, and JP-A No. 7-13295.

(Supersensitizer)

Useful combinations of sensitizing dyes and dyes exhibiting supersensitization, as well as materials exhibiting supersensitization, are described in Research Disclosure Item 17643 (published December 1978), page 23, Section J of IV; Japanese Patent Publication Nos. 9-25500 and 43-4933; and JP-A Nos. 59-19032, 59-192242, and 5-431432. Preferred as supersensitizers are hetero-aromatic mercapto compounds (Formula M) or mercapto derivatives (Formula Ma).

$$Ar-SM \qquad \text{Formula M:}$$

$$Ar-S-S-Ar \qquad \text{Formula Ma:}$$

wherein M represents a hydrogen atom or an alkali metal atom, and Ar represents an aromatic ring or a condensed aromatic ring, having at least one of a nitrogen, sulfur, oxygen, selenium, or tellurium atom. Hetero-aromatic rings are preferably benzimidazole, naphthoimidazole, benzimidazole, naphthothiazole, benzoxazole, naphthooxazole, benzoselenazole, benztellurazole, imidazole, oxazole, pyrazole, triazole, triazine, pyrimidine, pyridazine, pyrazine, pyridine, purine, quinoline, or quinazoline. In Formula Ma, Ar indicates the same as in Formula M.

The aforesaid hetero-aromatic rings may have a substituent selected from the group consisting of, for example, a halogen atom (for example, Cl, Br, and I), a hydroxyl group, an amino group, a carboxyl group, an alkyl group (for example, an alkyl group having at least one carbon atom and preferably having from 1 to 4 carbon atoms), and an alkoxy group (for example, an alkoxy group having at least one carbon atom and preferably having from 1 to 4 carbon atoms).

The amount of a supersensitizer of the present invention used in a photosensitive layer containing an organic silver salt and silver halide grains, and in the present invention is in the range of 0.001 to 1.0 mol per mol of Ag. More preferably, it is 0.01 to 0.5 mol per mol of Ag.

It is possible to incorporate large cyclic compounds containing a heteroatom into the photosensitive layer according to the present invention. The above compounds are preferably at least 9-membered large cyclic compounds containing at least a nitrogen atom, an oxygen atom, a sulfur atom, or a selenium atom as a heteroatom, are more preferably 12- to 24-membered cyclic compounds, but are most preferably 15- to 21-membered cyclic compounds.

Representative compounds include crown ethers, which -were synthesized by Pederson below in 1967 and after the reports of their unique properties, many of them have been synthesized. The above compounds are described in C. J. Pederson, Journal of American Chemical Society, Vol. 86 (2495), 7017–7036 (1967), and G. W. Gokel and S. H. Korzeniowski, "Macrocylic Polyether Synthesis", Springer-Vergal (1982).

Other than the additives described above, it is possible to employ, for example, surface active agents, antioxidants, stabilizers, plasticizers, UV absorbers, and covering aids in the photosensitive layer according to the present invention. Preferably employed as these additives and the other additives described above are those described in RD Item 17029 (pages 9–15, June 1978).

In the present invention, the photosensitive layer may be composed of a single layer or a plurality of layers in which compositions are the same or different. Further, the thickness of the photosensitive layer is commonly 10–30 μm.

The support and protective layer which are essential as a layer constitution of the heat developable photosensitive material of the present invention will now be detailed.

(Supports)

Listed as supports employed in the heat developable photosensitive materials of the present invention may, for example, be each resinous film composed of acrylic acid ester, methacrylic acid ester, polyethylene terephthalate, polybutylene terephthalate, polyethylene naphthalate, polycarbonate, polyarylate, polyvinyl chloride, polyethylene, polypropylene, polystyrene, nylon, aromatic amides, polyether ketone, polysulfone, polyether sulfone, polyimides, polyether imides, or triacetyl cellulose, and resinous film which is prepared by laminating at least two layers composed of the above resins.

The supports according to the present invention are employed in such a manner that in the image recording method described below, after forming a latent image, an image is visualized via heat development. Therefore, in view of dimensional stability, preferred are those which are stretched into a film shape and subjected to heat setting. Incidentally, incorporated may be fillers such as titanium oxide, zinc oxide, barium sulfate, or calcium carbonate in an amount which does not adversely affect the desired effects of the present invention. Further, the thickness of supports is commonly about 10–500 μm, but is preferably 25–250 μm.

(Protective Layer)

Incorporated into the protective layer employed in the heat developable photosensitive materials of the present invention, if desired, may be the binder resins described in the above photosensitive layer while suitably selected.

For the purpose of minimizing damage to images after heat development and ensuring desired conveying properties, additives added to the protective layer preferably include fillers. In the case of the addition of fillers, their content is preferably 0.05–30 percent by weight with respect to the layer forming compositions.

Further, in order to improve lubricating properties and electrification properties, incorporated into the protective layer may be lubricants and antistatic agents. Listed as these lubricants may, for example, be fatty acids, fatty acid esters, fatty acid amides, polyoxyethylene, polyoxypropylene, (modified) silicone oil, (modified) silicone resins, fluororesins, carbon fluoride, and wax. Further, listed as antistatic agents may be cationic surface active agents, anionic surface active agents, nonionic surface active agents, polymer antistatic agents, metal oxides, or conductive polymers, as well as compounds described on pages 875–876 of "11290 no Kagaku Shohin (11290 Chemical Products)", Kagaku Kogyo Nippo Sha, and compounds described in columns 14–20 of U.S. Pat. No. 5,244,773. Various additives incorporated into the photosensitive layer may be added to the protective layer in the amount range which does not adversely affect the purpose of the present invention. The added amount of these additives is preferably 0.01–20 percent by weight of the protective layer forming components, but is more preferably 0.05–10 percent by weight.

In the present invention, the protective layer may be composed of a single layer or a plurality of layers, in which the compositions are the same or different. The thickness of the protective layer is commonly 1.0–5.0 μm.

In the present invention, in order to enhance adhesion between the support and the photosensitive layer, an interlayer may be provided other than the above photosensitive layer, support and protective layer, while for the purpose of minimizing static electricity, a back coat layer may be provided. The thickness of the provided interlayer is commonly 0.05–2.0 μm, while the thickness of the back coat layer is commonly 0.1–10 μm.

(Production of Heat Developable Photosensitive Materials)

It is possible to prepare the photosensitive layer liquid coating composition and the protective layer liquid coating composition according to the present invention, as well as the liquid coating composition of the interlayer and the back coat layer which are provided, if desired, by dissolving or dispersing the above components in each of the solvents.

Employed as solvents usable in the above preparation may be those in the range of a solubility parameter value of 6.0–15.0, which is shown in "Yozai Pocket Book (Solvent Handbook" edited by Yuki Gosei Kagaku Kyokai. Listed as solvents usable in liquid coating composition to form each layer according to the present invention are ketones such as acetone, isoforon, ethyl amyl ketone, methyl ethyl ketone, or methyl isobutyl ketone; alcohols such as methyl alcohol, ethyl alcohol, n-propyl alcohol, isopropyl alcohol, n-butyl alcohol, isobutyl alcohol, diacetone alcohol, cyclohexanol, or benzyl alcohol; glycols such as ethylene glycol, diethylene glycol, triethylene glycol, propylene glycol, or hexylene glycol; ether alcohols such as ethylene glycol monomethyl ether or diethylene glycol monoethyl ether; ethers such as ethyl ether, dioxane, or isopropyl ether; esters such as ethyl acetate, butyl acetate, amyl acetate, or isopropyl acetate; hydrocarbons such as n-pentane, n-hexane, n-heptane, cyclohexane, benzene, toluene, or xylene; chlorides such as methyl chloride, methylene chloride, chloroform, or dichlorobenzene. However, solvents are not limited to the above as long as the effects of the present invention are not adversely affected.

Further, these solvents may be employed individually or in combination of several types. Incidentally, it is possible to control the residual amount of the above solvents by appropriately setting the temperature conditions of the drying process after coating. The total amount of residual solvents is preferably 5–1,000 mg/m$^2$, but is more preferably 10–300 mg/m$^2$.

During preparation of liquid coating compositions, in cases in which dispersion is required, it is possible to select a suitable homogenizer from those known in the art, such as a two-roller mill, a three-roller mill, a ball mill, a pebble mill, a cobol mill, a toron mill, a sand grinder, a SQEGVARI attritor, a high speed impeller homogenizer, a high speed stone mill, a high speed impact mill, a disper, a high speed mixer, a homogenizer, an ultrasonic homogenizer, an open kneader, or a continuous kneader and then employ it.

It is possible to coat the liquid coating compositions prepared as above in such a manner that an appropriate coater is selected from those known in the art, such as an extrusion system extrusion coater, a reverse roller coater, a gravure roller coater, an air doctor coater, a blade coater, an air-knife coater, a squeeze coater, an impregnation coater, a bar coater, a transfer roller coater, a kiss coater, a cast coater, or a spray coater and then use it. Of these, in order to minimize thickness fluctuation of the resulting layer, it is preferable to use an extrusion system extrusion coater or a roller coater such as a reverse roller coater.

Further, in cases in which a protective layer is coated, coaters are not particularly limited as long as the resulting photosensitive layer is free from damage. However, when solvents used in the protective layer forming liquid coating composition exhibit possibility of dissolving the photosensitive layer, of the above coater stations, it is possible to use an extrusion system extrusion coater as well as a gravure roller coater or a bar coater. Incidentally, of these, when a contact coating method employing a gravure roller coater or a bar coater is used, the rotation direction of the gravure roller or bar may be normal or reverse to the conveying direction. In the case of normal rotation, the rotation rate may be the same or differ in the peripheral rate.

Further, when a multilayered structure is to be achieved, each layer may be repeatedly coated, but simultaneous multilayered coating may be employed via a wet-on-wet system. In such a case, it is possible to perform coating employing the combinations of an extrusion system extrusion coater with another coater such as a reverse roller coater, a gravure roller coater, an air-doctor coater, a blade coater, an air-knife coater, a squeeze coater, an impregnation coater, a bar coater, a transfer roller coater, a kiss coater, a cast coater, or a spray coater. When multilayer coating is performed employing the above wet-on-wet system, an upper layer is applied onto a lower layer which is still wet, whereby adhesion between the upper layer and the lower layer is enhanced.

Further, in the present invention in order to effectively exhibit the purposes of the present invention, after coating of at least a photosensitive layer, it is preferable that the resulting coating is dried in the range from 65 to 100° C. When the drying temperature is at most 65° C., photographic speed occasionally varies during storage, while when it is at least 100° C., heat developable photosensitive materials immediately after production themselves occasionally suffer from fogging (coloration). Therefore, it is not preferable to perform drying beyond the above range. Further, it is not possible to practically specify drying time since it varies depending on airflow, but it is preferable that drying is commonly completed within 2–30 minutes.

Incidentally, drying may be performed within the above temperature range immediately after coating, while in order to minimize Marangoni of liquid coating compositions which occurs during drying and mottling (citron skinning) which results in such a manner that the surface and its adjacent portions are initially dried by heated airflow, drying may be initially performed at 60° C. or less and thereafter at drying temperatures in the above range.

By employing the heat developable photosensitive material of the present invention and its suitable production method, it is possible to achieve the objects of the present invention. Further, by optimizing an image recording method, it is possible to obtain clear images without interference fringes.

(Image Recording Method)

An image recording method which is suitable for the heat developable photosensitive material of the present invention will now be detailed.

The image recording method usable in the present invention is divided into three embodiments based on the angle of the exposed surface to a laser beam, the wavelength of the laser beams, and the number of lasers. These embodiments may be practiced individually or in combinations of at least two. By employing the above image forming method, it is possible to obtain sharp images without interference fringes.

In the present invention, listed as an appropriate embodiment as an image recording method is one in which images are formed by scanning exposure employing a laser beam which does not substantially form a right angle to the exposed surface of a heat developable photosensitive material. As noted above, by shifting the incident angle from a right angle, even in cases in which reflected light is generated in an interlayer between layers, the length of the optical path reaching the photosensitive layer increases, whereby interference fringes rarely occur due to scattering and attenuation of the laser beam in its optical path. Incidentally, as used herein, "no substantial formation of a right angle" means that during laser scanning, the angle which is nearest a right angle is preferably 55–88 degrees, is more preferably 60–86 degrees, but is still more preferably 65–84 degrees.

Further, listed as a more appropriate embodiment in the image recording method of the present invention is one in which images are formed via scanning employing a longitudinal multi laser in which the wavelength of exposure light is not a single value. When scanning is performed employing such a longitudinal multi laser beam having a width of wavelengths, the generation of inference fringes is reduced compared to a scanning laser beam of a single longitudinal mode. Incidentally, "longitudinal multi", as described herein, means that the wavelength of exposure light is not a single wavelength. The distribution of the wavelength of exposure light is commonly at least 5 nm, but is preferably at least 10 nm. The upper limit of the wavelength of exposure light is not particularly limited, but is commonly a maximum of about 60 nm.

In the aforesaid recording, it is possible to suitably select any of the following lasers employed for scanning exposure, which are generally well known, while matching the use. The aforesaid lasers include solid lasers such as a ruby laser, a YAG laser, and a glass laser; gas lasers such as a HeNe laser, an Ar ion laser, a Kr ion laser, a $CO_2$ laser a CO laser, a HeCd laser, an $N_2$ laser, and an excimer laser; semiconductor lasers such as an InGaP laser, an AlGaAs laser, a GaASP laser, an InGaAs laser, an InAsP laser, a $CdSnP_2$ laser, and a GaSb laser; chemical lasers; and dye lasers. Of these, from the viewpoint of maintenance as well as the size of light sources, it is preferable to employ any of the semiconductor lasers having a wavelength of 600 to 1,200 nm.

The beam spot diameter of lasers employed in laser imagers, as well as laser image setters, is commonly in the range of 5 to 75 µm in terms of a short axis diameter and in the range of 5 to 100 µm in terms of a long axis diameter. Further, it is possible to set a laser beam scanning rate at the optimal value for each photosensitive material depending on the inherent speed of the silver salt photothermographic dry imaging material at laser transmitting wavelength and the laser power.

In the present invention, it is preferable to expose the photothermographic material of the present invention with the aforesaid laser, then to heat the exposed photothermographic material to a temperature of 80 to 250° C. to form an image.

(Synthesis Example of Squarylium)

The synthetic method to prepare squarylium dyes employed in the present invention will now be described with reference to the synthesis examples below. The molecular structure of all the products in the synthesis examples were identified based on proton nuclear magnetic resonance analysis and mass spectrometry.

SYNTHESIS EXAMPLE 1

Exemplified Compound sq-1

Exemplified Compound sq-1 was obtained via the synthetic scheme described below.

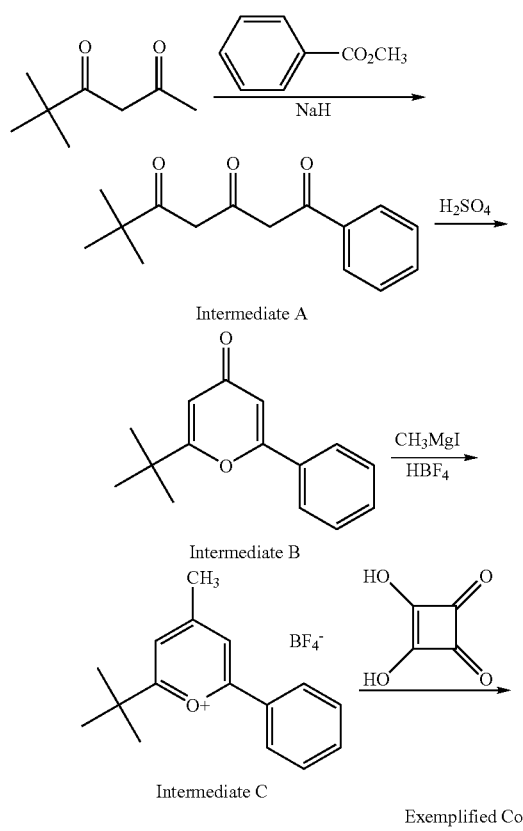

Intermediate A

Intermediate B

Intermediate C

Exemplified Compound (Synthesis of Intermediate A)

Added to 7.0 g of sodium hydride was 70 ml of ethylene glycol dimethyl ether, and the resulting mixture was subjected to thermal reflux. A solution, prepared by dissolving 5.0 g. of 5,5-dimethylhexane-2,4-dione (prepared employing the method described in J. Amer. Chem. Soc., 1950, 72, 1352–1356) and 7.2 g of methyl benzoate in 70 ml of ethylene glycol dimethyl ether, was dripped into the solution under thermal reflux. After dripping, thermal flux was performed over 6 hours, and the resulting solution was then allowed to stand to cool to room temperature. After distilling out the solvents, employing vacuum concentration, 70 ml of hexane was added. The reaction solution was cooled employing iced water, and 200 ml of water was gradually added. After equilibrating the reaction solution to room temperature, an aqueous layer was collected and washed with 70 ml of hexane. Concentrated hydrochloric acid was added to the aqueous layer and the pH was controlled to 2. Thereafter, extraction was performed employing 200 ml of ethyl acetate. After collecting the organic layer, drying was performed employing sodium sulfate, and sodium sulfate was removed employing vacuum filtration. By distilling out the solvents employing vacuum concentration, 6.9 g of Intermediate A was obtained.

(Synthesis of Intermediate B)

Under water cooling, 6.9 g of Intermediate A was added to 35 ml of sulfuric acid, and the resulting mixture was stirred at room temperature for one hour. The liquid reaction composition was dripped into 350 ml of ice-cooled water, and deposited crystals were collected via filtration. The resulting crystals were washed with 50 ml of water and then dried, whereby 6.1 g of Intermediate B was obtained.

(Synthesis of Intermediate C)

Under a nitrogen ambience, 5.0 g of Intermediate B was dissolved in 50 ml of tetrahydrofuran. Subsequently, methylmagnesium iodide (being a 0.84 mol/L ether solution) was dripped into the resulting solution cooled employing water. After dripping, thermal reflux was performed over three hours. The reaction solution was cooled employing iced water, and 300 ml of water was gradually added, followed by the addition of 50 ml of tetrafluoroboric acid (being a 42 weight percent aqueous solution). After stirring at room temperature for one hour, deposited crystals were collected by filtration. The resulting crystals were recrystallized in methanol, whereby 5.1 g of Intermediate C was obtained.

(Synthesis of Exemplified Compound sq-1)

Successively, 2.0 g of Intermediate C, 0.36 g of 3,4-dihydroxy-3-cyclobutene-1,2-dione, and 20 ml of n-propanol were mixed and the resulting mixture was subjected to thermal reflux over three hours. The liquid reaction composition was cooled to room temperature and solvents were distilled out under vacuum concentration. Thereafter, by employing purification via silica gel column chromatography, 0.3 g of Exemplified Compound sq-1 was obtained.

Mass: m/z 531 (M+)

λmax: 773.0 nm (in 2-butanone)

ε: 222,000 (in 2-butanone)

SYNTHESIS EXAMPLE 2

Exemplified Compound sq-3

Exemplified Compound sq-3 was obtained via the synthetic scheme described below.

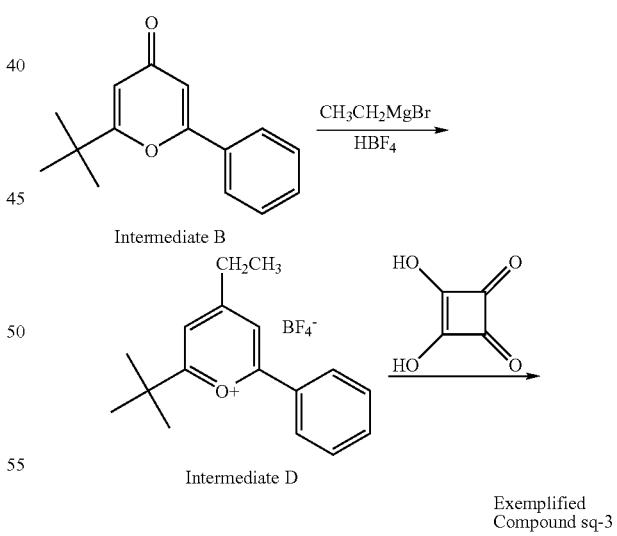

Intermediate B

Intermediate D

Exemplified Compound sq-3

(Synthesis of Intermediate D)

Under a nitrogen ambience, 5.0 g of Intermediate B was dissolved in 50 ml of tetrahydrofuran. Subsequently, ethylmagnesium bromide (being a 0.96 mol/L tetrahydrofuran solution) was dripped into the resulting water cooled solution. After dripping, thermal reflux was conducted over three hours. The reaction solution was cooled employing iced water, and 500 ml of water was gradually added, followed by the addition of 50 ml of tetrafluoroboric acid (being a 42 weight percent aqueous solution). Subsequently added was 100 ml of methylene chloride, and the resulting mixture was stirred at room temperature over two hours. Thereafter, the organic layer was collected. After drying the collected organic layer employing magnesium sulfate, the magnesium sulfate was removed employing vacuum filtration. After distilling out the solvents via vacuum concentration, the resulting crystals were subjected to suspension washing employing ethyl acetate, whereby 4.6 g of Intermediate D was obtained.

(Synthesis of Exemplified Compound sq-3)

Successively, 3.0 g of Intermediate C, 0.52 g of 3,4-dihydroxy-3-cyclobutene-1,2-dione, 30 ml of n-propanol, and 3.2 g of quinoline were mixed and the resulting mixture was subjected to thermal reflux over three hours. After cooling to room temperature, deposited crystals were collected via filtration. The resulting crystals were dissolved in 200 ml of methylene chloride, and insoluble materials were removed employing vacuum filtration. After distilling out solvents employing vacuum concentration, the resulting crystals were subjected to suspension washing, whereby Exemplified Compound sq-3 was obtained.

Mass: m/z 559 (M+)

λmax: 819.5 nm (in 2-butane)

ε: 150,000 (in $^2$-butanone)

SYNTHESIS EXAMPLE 3

Exemplified Compound sq-6

Exemplified Compound sq-6 was obtained via the synthetic scheme described below.

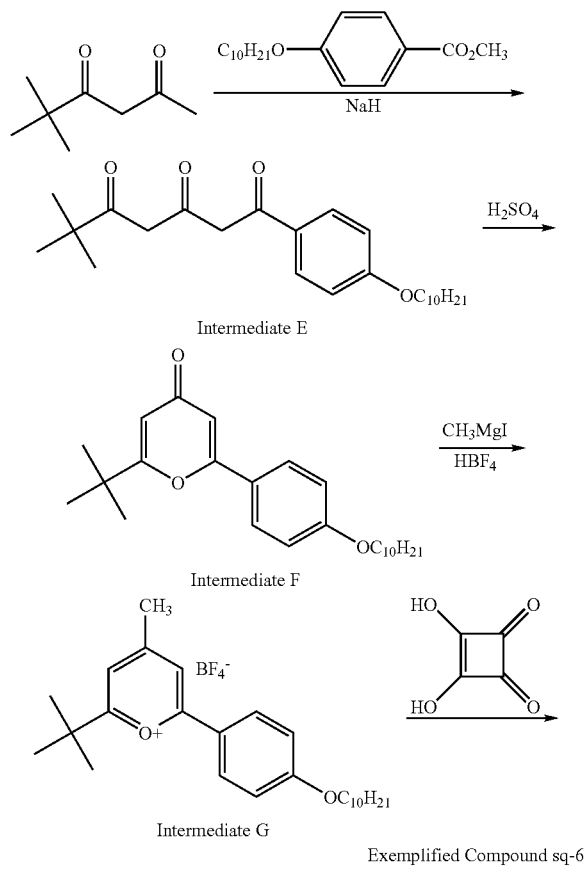

(Synthesis of Intermediate E)

Added to 9.8 g of sodium hydride was 140 ml of ethylene glycol dimethyl ether, and the resulting mixture was subjected to thermal reflux. A solution, prepared by dissolving 7.0 g of 5,5-dimethylhexane-2,4-dione (prepared employing the method described in J. Amer. Chem. Soc., 1950, 72, 1352–1356) and 20.5 g of methyl benzoate in 140 ml of ethylene glycol dimethyl ether, was dripped into the solution under thermal reflux. After dripping, thermal reflux was performed over 6 hours, and the resulting solution was then allowed to stand to cool to room temperature. After distilling out the solvents employing vacuum concentration, the reaction solution was cooled with iced water and 400 ml of water was gradually added. After stirring the resulting mixture cooled with iced water for one hour, deposited crystals were collected via filtration and washed with water. After suspending the resulting crystals into 200 ml of ethyl acetate, 200 ml of water and concentrated hydrochloric acid were successively added whereby the pH was adjusted to 1. After collecting the organic layer, drying was performed employing sodium sulfate, and sodium sulfate was removed employing vacuum filtration. Subsequently, vacuum concentration was performed and 100 ml of hexane was added to the resulting residue. The resulting mixture was stirred for one hour at room temperature. After removing the resulting crystals employing vacuum filtration, the filtrate was cooled with iced water and stirred for two hours. Deposited crystals were collected via filtration and dried, whereby 8.8 g of Intermediate E was obtained.

(Synthesis of Intermediate F)

Under iced water cooling, 8.8 g of Intermediate E was added to 80 ml of sulfuric acid, and the resulting mixture was stirred for one hour. The resulting reaction solution was dripped into 800 ml of ice cooled water. After performing extraction employing 200 ml of ethyl acetate, the organic layer was dried employing magnesium sulfate. After distilling out the solvents employing vacuum concentration, the resulting residue was purified employing silica gel column chromatography, whereby 4.0 g of Intermediate F was obtained.

(Synthesis of Intermediate G)

Under a nitrogen ambience, 2.8 g of Intermediate F was dissolved in 28 ml of tetrahydrofuran. Subsequently, 13 ml of methylmagnesium iodide (being a 0.84 mol/L ether solution) was dripped into the resulting water cooled solution. After dripping, thermal reflux was performed over three hours. The reaction solution was cooled with iced water, and 140 ml of water was gradually added, followed by the addition of 28 ml of tetrafluoroboric acid (being a 42 weight percent aqueous solution). After stirring at room temperature for two hours, deposited crystals were collected by filtration. The resulting crystals were recrystallized in hexane, whereby 2.4 g of Intermediate G was obtained.

(Synthesis of Exemplified Compound sq-6)

Successively, 2.4 g of Intermediate G, 0.28 g of 3,4-dihydroxy-3-cyclobutene-1,2-dione, 25 ml of n-propanol, and 1.7 g of quinoline were mixed and the resulting mixture was subjected to thermal reflux over three hours. The reaction solution was cooled to room temperature. After stirring for three hours, deposited crystals were collected via filtration. After dissolving the crystals collected by filtration in 50 ml of methylene chloride, the organic layer was washed with 50 ml of water. The organic layer was dried employing sodium sulfate, which was then removed by vacuum filtration. After distilling out the solvents employing vacuum concentration, the residue was subjected to suspension washing employing ethanol, whereby Exemplified Compound sq-6 was obtained.

Mass: m/z 844 (M+)
λmax: 779.5 nm (in 2-butanone)
ε: 287,000 (in 2-butanone)

SYNTHESIS EXAMPLE 4

Exemplified Compound sq-34

Exemplified Compound sq-34 was obtained via the synthetic scheme described below.

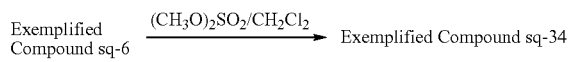

Dissolved in 18 ml of methylene chloride was 1.7 g of Exemplified Compound sq-6, and 1.5 g of dimethyl sulfate was added to the resulting solution. The resulting mixture was subjected to thermal reflux over 6 hours. Subsequently, after stirring the reaction solution at room temperature for 24 hours, 1.9 g of sodium methoxide (being a 28 weight percent methanol solution) was gradually dripped. After dripping, the resulting mixture was stirred at room temperature for 4 hours. Thereafter, successively, 15 ml of water and 3.5 ml of tetrafluoroboric acid (being a 42 weight percent aqueous solution) were added, and the resulting mixture was stirred for an additional hour. The resulting organic layer was collected and dried employing sodium sulfate, which was then removed employing vacuum filtration. After removing the solvents employing vacuum concentration, recrystallization was conducted employed a mixed solvent of methylene chloride and diisopropyl ether, whereby Exemplified Compound sq-34 was obtained.

λmax: 744.5 nm (in 2-butanone)

Other squarylium compounds were prepared in the similar method described above.

Exemplified Compound sq-36
λmax: 784.5 nm (in 2-butanone)
ε: 224,000 (in 2-butanone)

Exemplified Compound sq-43
λmax: 785.5 nm (in 2-butanone)
ε: 236,000 (in 2-butanone)

EXAMPLES

The present invention will now be detailed with reference to examples, however the present invention is hot limited thereto. Incidentally, "%" is "% by weight" unless otherwise specified.

Example 1

(Preparation of Subbed Photographic Supports)

Both sides of a commercially available biaxially oriented 175 μm thick PET film tinted in blue at an optical density of 0.170 were subjected to corona discharge of 8 W/m². Subsequently, Liquid Subbing Coating Composition a-1, described below, was applied onto one side to result in a dried layer thickness of 0.8 μm and subsequently dried. The resulting sublayer was designated as Sublayer A-1. Liquid Subbing Coating Composition b-1, described below, was applied onto the other side to result in a dried layer thickness of 0.8 μm, and subsequently dried. The resulting sublayer was designated as Sublayer B-1.

| <<Liquid Subbing Coating Composition a-1>> | |
| --- | --- |
| Butyl acrylate (30%)/t-butyl acrylate (20%)/styrene (25%)/2-hydroxyethyl acrylate (25%) copolymer latex (solids 30%) | 270 g |
| C-1 | 0.6 g |
| Hexamethylene-1,6-bis(ethyleneurea) | 0.8 g |
| Water to make | 1 liter |

| <<Liquid Subbing Coating Composition b-1>> | |
| --- | --- |
| Butyl acrylate (40%)/styrene (20%)/glycidyl acrylate (40%) copolymer latex (solids 30%) | 270 g |
| C-1 | 0.6 g |
| Hexamethylene-1,6-bis(ethyleneurea) | 0.8 g |
| Water to make | 1 liter |

Subsequently, the surface of each of Subbing Layers A-1 and B-1 was subjected to corona discharge of 8 W/m². Upper Subbing Layer Liquid Coating Composition a-2, described below, was applied onto Sublayer A-1 to result in a dried layer thickness of 0.1 μm and the dried layer was designated as Upper Sublayer A-2. Upper Sublayer Coating Composition b-2, described below, was applied onto Sublayer B-1 to result in a dried layer thickness of 0.8 μm and dried, which was designated as Upper Sublayer B-2 exhibiting-an antistatic function.

| <<Upper Sublayer Liquid Coating Composition a-2>> | |
| --- | --- |
| Gelatin amount to achieve | 0.4 g/m² |
| C-1 | 0.2 g |
| C-2 | 0.2 g |
| C-3 | 0.1 g |
| Silica particles (at an average particles diameter of 3 μm) | 0.1 g |
| Water to make | 1 liter |

| <<Upper Sublayer Liquid Coating Composition b-2>> | |
| --- | --- |
| C-4 | 60 g |
| Latex (solids 20%) composed of C-5 as a component | 80 g |
| Ammonium sulfate | 0.5 g |
| C-6 | 12 g |
| Polyethylene glycol (at a weight average molecular weight of 600) | 6 g |
| Water to make | 1 liter |

While stirring, added to 830 g of methyl ethyl ketone were 84.2 g of cellulose acetate butyrate (CAB381-20, available from Eastman Chemical Co.) and 4.5 g of a polyester resin (VITEL PE2200B, available from Bostic Co.), and were dissolved. Subsequently, 0.57 millimol of an infrared dye (listed in Table 1), 4.5 g of F based surface active agent (SURFRON KH40, available from Asahi Glass Co., Ltd.), and other F based surface active agent (MEGAFAG F120K, available from Dainippon Ink and Chemicals, Inc.) were added and the resulting mixture was vigorously stirred until they were dissolved. Finally, 75 g of silica (SILOID 64X6000, available from W. R. Grace Co.) which had been dispersed into methyl ethyl ketone at a concentration of 1%, employing a dissolver type homogenizer was added while stirring, whereby a rear surface liquid coating composition was prepared.

The rear surface liquid coating composition, prepared as above, was applied onto Upper Sublayer B-2 of the subbed photographic support prepared as described above to result in a dried layer thickness of 3.5 μm, employing an extrusion coater and subsequently dried for 5 minutes employing forced drying air at a drying temperature of 100° C. and a dew-point temperature of 10° C.

<<Preparation of Photosensitive Silver Halide Emulsion A>>
The following mixture was prepared.

(Solution A1)

| | |
|---|---|
| Phenylcarbamoyl-modified gelatin | 88.3 g |
| Compound (*1) (10% aqueous methanol solution) | 10 ml |
| Potassium bromide | 0.32 g |
| Water to make | 5429 ml |

(Solution B1)

| | |
|---|---|
| 0.67 mol/L aqueous silver nitrate solution | 2635 ml |

(Solution C1)

| | |
|---|---|
| Potassium bromide | 51.55 g |
| Potassium iodide | 1.47 g |
| Water to make | 660 ml |

(Solution D1)

| | |
|---|---|
| Potassium bromide | 154.9 g |
| Potassium iodide | 4.41 g |
| Iridium chloride (1% aqueous solution) | 0.93 ml |
| Water to make | 1982 ml |

(Solution E1)

| | |
|---|---|
| 0.4 mol/L aqueous potassium bromide solution the following amount controlled by silver potential | |

(Solution F1)

| | |
|---|---|
| Potassium hydroxide | 0.71 g |
| Water to make | 20 ml |

(Solution G1)

| | |
|---|---|
| 56 percent aqueous acetic acid solution | 18.0 ml |

(Solution H1)

| | |
|---|---|
| Sodium carbonate anhydride | 1.72 g |
| Water to make | 151 ml |

(*1) Compound A: $HO(CH_2CH_2O)_n(CH(CH_3)CH_2O)_{17}(CH_2CH_2O)_mH$ (m + N = 5 through 7)

Upon employing a mixing stirrer shown in Japanese Patent Publication Nos. 58-58288 and 58-5828.9, ¼ portion of Solution B1 and whole Solution C1 were added to Solution A1 over 4 minutes 45 seconds, employing a double-jet precipitation method while adjusting the temperature to 30° C. and the pAg to 8.09, whereby nuclei were formed. After one minute, whole Solution F1 was added. During the addition, the pAg was appropriately adjusted employing Solution E1. After 6 minutes, ¾ portion of Solution B1 and whole Solution D1 were added over 14 minutes 15 seconds, employing a double-jet precipitation method while adjusting the temperature to 30° C. and the pAg to 8.09. After stirring for 5 minutes, the mixture was cooled to 40° C., and whole Solution G1 was added, whereby a silver halide emulsion was flocculated. Subsequently, while leaving 2000 ml of the flocculated portion, the supernatant was removed, and 10 L of water was added. After stirring, the silver halide emulsion was again flocculated. While leaving 1,500 ml of the flocculated portion, the supernatant was removed. Further, 10 L of water was added. After stirring, the silver halide emulsion was flocculated. While leaving 1,500 ml of the flocculated portion, the supernatant was removed. Subsequently, Solution H1 was added and the resultant mixture was heated to 60° C., and then stirred for an additional 120 minutes. Finally, the pH was adjusted to 5.8 and water was added so that the weight was adjusted to 1,161 g per mol of silver, whereby an emulsion A was prepared.

The prepared emulsion was comprised of monodispersed cubic silver iodobromide grains having an average grain size of 0.058 μm, a grain size variation coefficient of 12 percent and a (100) surface ratio of 92 percent.

Then, 240 ml of 0.5% methanol solution of Sulfur sensitizer (S-5) was added to the above-described emulsion. And further, Gold sensitizer (Au-5) having a ½₀ mol equivalent of S-5 was added and stirred for 120 minutes at 55° C. to give chemical sensitization to the emulsion.

<<Preparation of Powdered Aliphatic Carboxylic Acid Silver Salt A>>

To 4720 ml of pure water were dissolved 117.7 g of behenic acid, 60.9 g of arachidic acid, 39.2 g of stearic acid and 2.1 g of palmitic acid at 80° C. Then 486.2 ml of a 1.5 M/L aqueous hydroxide solution and 6.2 ml of nitric acid were added and then stirred the resultant mixture by cooling at 55° C. to yield a solution of aliphatic carboxylic acid silver salt. By keeping the temperature of the solution at 55° C., 347 ml of t-butyl alcohol was added. Then it was further stirred for 20 minutes. Then 45.3 g of the above-prepared photosensitive silver halide emulsion 1 and 450 ml of pure water were added t the mixture and was allowed to stand for 5 minutes.

Then 702.6 ml of a 1 M/L aqueous silver nitrate solution was added t the mixture for 2 minutes and then stirred for 10 minutes to obtain a dispersion of aliphatic carboxylic acid silver salt.

Thereafter, the resultant aliphatic carboxylic acid silver salt dispersion was transferred to a water washing machine, and deionized water was added. After stirring, the resultant dispersion was allowed to stand, whereby a flocculated aliphatic carboxylic acid silver salt was allowed to float and was separated, and the lower portion, containing water-soluble salts, were removed. Thereafter, washing was repeated employing deionized water until electric conductivity of the resultant effluent reached 2 μS/cm. After centrifugal dehydration, the resultant cake-shaped aliphatic carboxylic acid silver salt was dried employing an gas flow type dryer Flush Jet Dryer (manufactured by Seishin Kikaku Co., Ltd.), while setting the drying conditions such as nitrogen gas as well as heating flow temperature at the inlet of the dryer (inlet temperature of 65° C. and outlet temperature of 40° C.), until its water content ratio reached 0.1 percent, whereby Powder Aliphatic Carboxylic Acid Silver Salt A was prepared.

The water content ratio of aliphatic carboxylic acid silver salt compositions was determined employing an infrared moisture meter.

<<Preparation of Preliminary Dispersion A>>

Dissolved in 1457 g of methyl ethyl ketone was 14.57 g of poly(vinyl butyral) resin (BUTVAR B-79 made by Monsanto Co. Ltd.). While stirring, employing Dissolver DISPERMAT Type CA-40M, manufactured by VMA-Getzmann Co., 500 g of aforesaid Powder Aliphatic Carboxylic Acid Silver Salt A was gradually added and sufficiently mixed, whereby Preliminary Dispersion A was prepared.

<<Preparation of Photosensitive Emulsion 1>>

Preliminary Dispersion A, prepared as above, was charged into a media type homogenizer DISPERMAT Type SL-C12EX (manufactured by VMA-Getzmann Co.), filled with 0.5 mm diameter zirconia beads so as to occupy 80 percent of the interior volume so that the retention time in the mill reached 1.5 minutes and was dispersed at a peripheral rate of the mill of 8 m/second, whereby Photosensitive Emulsion 1 was prepared.

<<Preparation of Stabilizer Solution>>

Stabilizer Solution was prepared by dissolving 1.0 g of Stabilizer 1 and 0.31 g of potassium acetate in 4.97 g of methanol.

<<Preparation of Infrared Sensitizing Dye A Solution>>

Infrared Sensitizing Dye A Solution was prepared by dissolving 1,9.2 mg of Infrared Sensitizing Dye 1, 10 mg of Infrared Sensitizing Dye 2, 1.48 g of 2-chloro-benzoic acid, 2.78 g of Stabilizer 2, and 365 mg of 5-methyl-2-mercaptobenzimidazole in 131.3. ml of MEK in a light-shielded room.

<<Preparation of Additive Solution "a">>

Additive Solution "a" was prepared by dissolving 43.56 g of Reducing Agent 1, 1.54 g of 4-methylphthalic acid, 0.15 g of aforesaid Infrared Dye (shown in Table 1) in 170 g of MEK (methyl ethyl ketone).

<<Preparation of Additive Solution "b">>

Additive Solution "b" was prepared by dissolving 3.56 g of OFI-65 and 3.43 g of phthalazine in 40.9 g of MEK.

<<Preparation of Photosensitive Layer Coating Composition>>

While stirring, 50 g of aforesaid Photosensitive Emulsion 1 and 15.11 g of MEK were mixed and the resultant mixture was maintained at 21° C. Subsequently, 390 µl of Antifoggant 1 (being a 10 percent methanol solution) was added and stirred for one hour. Further, 494 µl of calcium bromide (being a 10 percent methanol solution) was added and stirred for 20 minutes.

Subsequently, 167 ml of aforesaid Stabilizer Solution was added and stirred for 10.minutes. Thereafter, 1.32 g of aforesaid Infrared Sensitizing Dye was added and the resulting mixture was stirred for one hour.

Subsequently, the resulting mixture was cooled to 13° C. and stirred for an additional 30 minutes. While maintaining at 13° C., 13.31 g of poly(vinyl acetal) Resin (BUTVAR B-79 made by Monsanto Co. Ltd.) as a binder -was added and stirred for 30 minutes. Thereafter, 1.084 g of tetrachlorophthalic acid (being a 9.4 weight percent MEK solution) was added and stirred for 15 minutes. Further, while stirring, 12.43 g of Additive- Solution "a", 1.6 ml of Desmodur N300/aliphatic isocyanate, manufactured by Mobay Chemical Co. (being a 10 percent MEK solution), and 4.27 g of Additive Solution "b" were successively added, whereby Photosensitive Layer Coating Composition A was prepared.

<<Preparation of Matting Agent Dispersion>>

Dissolved in 42.5 g of MEK was cellulose acetate butyrate (7.5 g of CAB171-15, available from Eastman Chemical Co.). Subsequently, 5 g of calcium carbonate (SUPER-PFLEX200, available from Specialty Minerals Co.) was added, and the resulting mixture was dispersed at 8,000 rpm employing a dissolver type homogenizer for 30 minutes, whereby a matting agent dispersion was prepared.

<<Preparation of Surface Protective Layer Liquid Coating Composition>>

While stirring, dissolved in 865 g of MEK (methyl ethyl ketone) were 96 g of cellulose acetate butyrate (CAB171-15, available from Eastman Chemical Co.), 4.5 g of polymethyl methacrylic acid (PARALOID A-21, available from Rohm & Haas Co.), 1.5 g of a vinylsulfone compound (VSC), 1.0 g of benzotriazole, and 1.0 g of F based surface active agent (SURFRON KF40, available from Asahi Glass Co., Ltd). Subsequently, 30 g of the above matting agent dispersion was added while stirring, whereby a surface protective layer liquid coating composition was prepared.

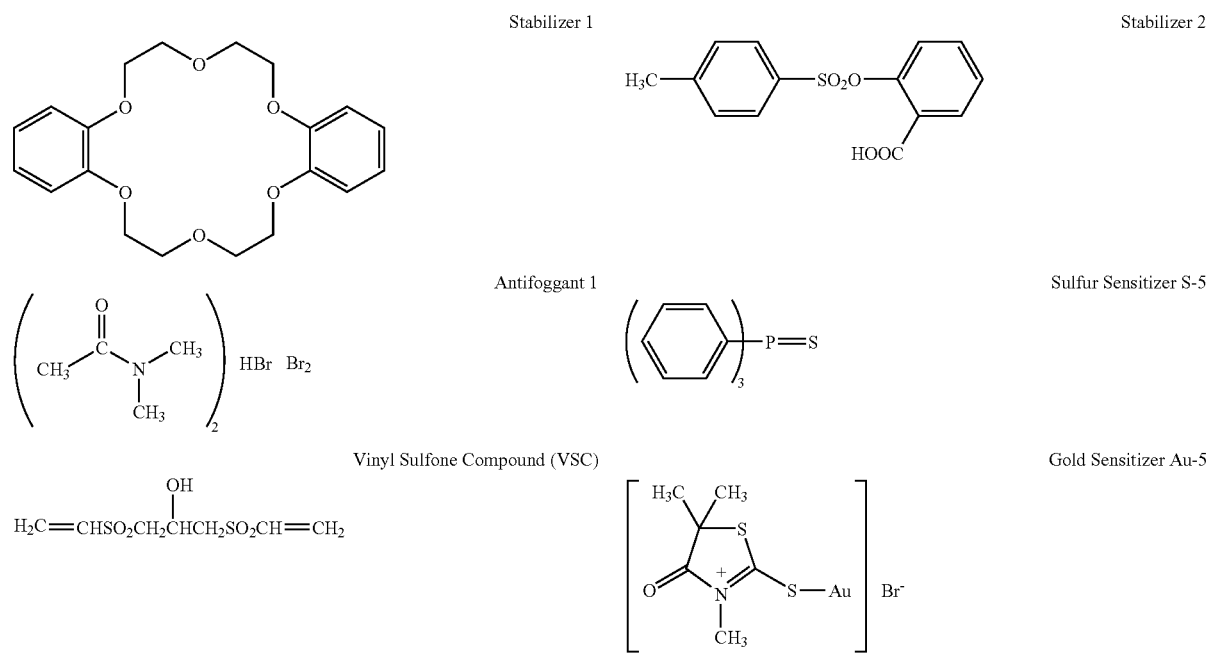

-continued
Antifoggant 2
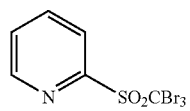
Sensitizing Dye 1
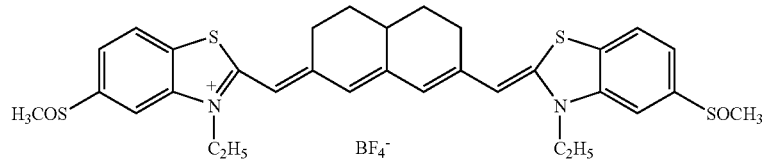
Reducing Agent 1
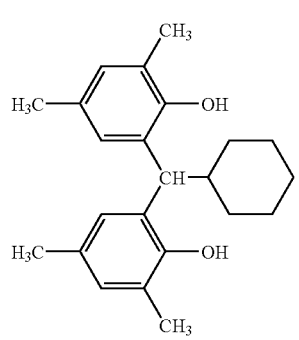
C-1
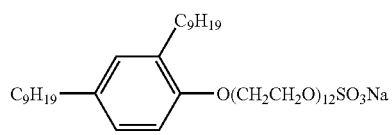
C-2
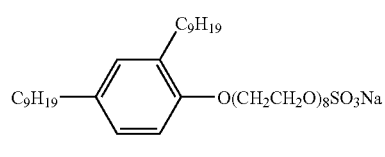
C-3
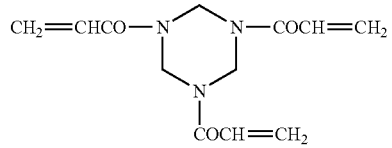
C-4
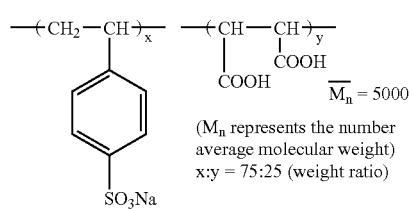
($M_n$ represents the number average molecular weight)
x:y = 75:25 (weight ratio)
C-5
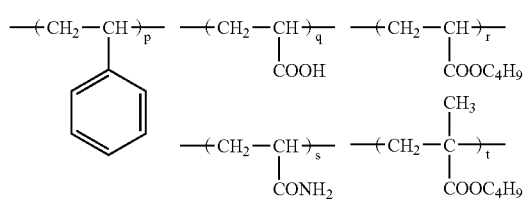
p:q:r:s:t = 40:5:10:5:40 (weight ratio)
C-6
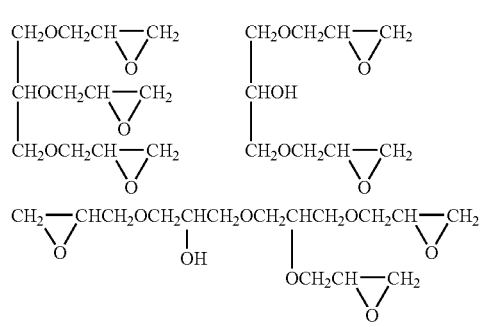
Mixture of Three Compound

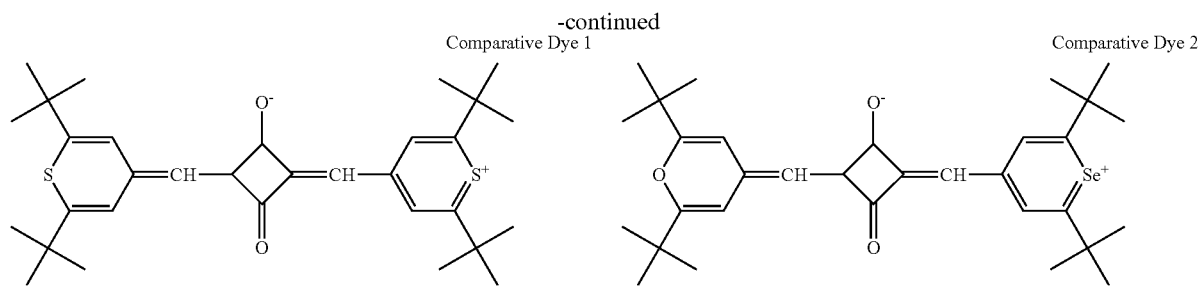

Comparative Dye 1

Comparative Dye 2

<<Coating onto Photosensitive Layer Surface Side>>

A photosensitive material was prepared by conducting simultaneous multilayer coatings of the above photosensitive layer liquid coating composition and the surface protective layer liquid coating composition, employing an extrusion coater. Coating was performed to result in a coated silver amount of the photosensitive layer of 1.9 g/m² and a dried layer thickness of the surface protective layer of 2.5 μm. Thereafter, drying was performed for 10 minutes employing a drying airflow at 75° C. and a dew-point temperature of 10° C., whereby a heat developable photosensitive material was obtained.

Scanning exposure was given onto the emulsion side surface of each sample prepared as above, employing an exposure apparatus in which a semiconductor laser having a wavelength of 785 nm was used. In such a case, images were formed while adjusting the angle between the exposed surface of the sample and the exposure laser beam to 75 degrees.

Thereafter, while employing an automatic processor having a heating drum, the protective layer of each sample was brought into contact with the surface of the drum and thermal development was carried out at 110° C. for 15 seconds. In such a case, exposure as well as development was carried out in the room which was conditioned at 23° C. and 50 percent relative humidity.

(Evaluation of Sharpness)

Three sheets of the heat developable photosensitive material prepared as above were placed in a tightly sealed container, the interior of which was maintained at 25° C. and 55% RH. Thereafter, the interior was maintained at 25° C. and 50° C. for 7 days. The second sheet of each of the samples was subjected to output of a chest image (an image sample prepared by employing a chest phantom). The resulting image was visually observed and sharpness was evaluated based on the criteria below. Table 1 shows the result.

A: very sharp
B: good but slightly blurred
C: blurring was marked, resulting in some difficulty of diagnosis via the image
D: diagnosis via the image was difficult due to blurring

TABLE 1

| Heat Developable Photosensitive Material No. | Infrared Dye | Sharpness 25° C., 7 days | Sharpness 50° C., 7 days | Remarks |
|---|---|---|---|---|
| 1 | Comparative Dye 1 | C | C | Comparative Example |
| 2 | Comparative Dye 2 | B | C | Comparative Example |
| 3 | sq-1 | B | B | Present Invention |
| 4 | sq-4 | A | A | Present Invention |
| 5 | sq-5 | A | B | Present Invention |
| 6 | sq-6 | A | A | Present Invention |
| 7 | sq-8 | A | A | Present Invention |
| 8 | sq-9 | A | A | Present Invention |
| 9 | sq-15 | A | A | Present Invention |
| 10 | sq-17 | B | B | Present Invention |
| 11 | sq-21 | A | B | Present Invention |
| 12 | sq-34 | A | B | Present Invention |
| 13 | sq-36 | A | A | Present Invention |
| 14 | sq-40 | A | A | Present Invention |
| 15 | sq-42 | A | A | Present Invention |
| 16 | sq-43 | A | A | Present Invention |
| 17 | sq-46 | A | A | Present Invention |

As can be seen from Table 1, the heat developable photosensitive materials incorporating the infrared dyes of the present invention exhibited excellent sharpness during storage at high temperature and high humidity, compared to the comparative examples.

What is claimed is:

1. A photothermographic material comprising a support having on one side of the support a photosensitive layer comprising:

photosensitive silver halide grains; and a compound represented by Formula (3) or Formula (4):

Formula 3

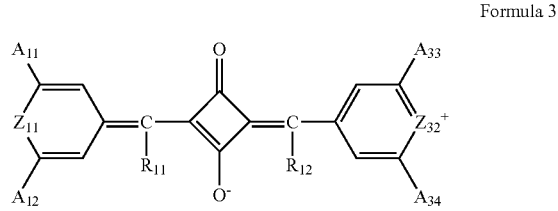

wherein $R_{11}$ and $R_{12}$ are each independently a hydrogen atom or a substituent; $Z_{11}$ is O, S, N—$R_1$, Se or Te, provided that $R_1$ is an alkyl group or an aryl group; $A_{11}$ and $A_{12}$ are each independently a substituent, provided that $A_{11}$ and $A_{12}$ are different groups from each other, $Z_{32}$ O, S, N—$R_3$, Se or Te, provided that $R_3$ is an alkyl group or an aryl group; and $A_{33}$ and $A_{34}$ are each independently a hydrogen atom or a substituent, Formula (4)

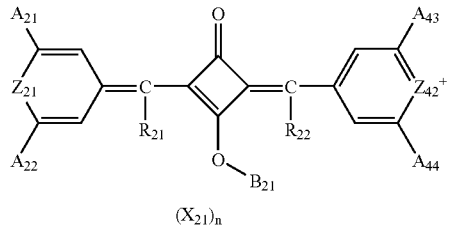

wherein $R_{21}$ and $R_{22}$ are each independently a hydrogen atom or a substituent; $Z_{21}$ is O, S, N—$R_2$, Se or Te, provided that $R_2$ is an alkyl group or an aryl group; $A_{21}$ and $A_{22}$ are each independently a substituent, provided that $A_{21}$ and $A_{22}$ are different groups from each other; $B_{21}$ is an alkyl group or an aryl group; $X_{21}$ is an ion which compensate an electric charge of the molecule; and n is 0 or 1, provided that n is 0 when the molecule forms an inner salt; $Z_4$, is O, S, N—$R_4$, Se or Te, provided that $R_4$ is an alkyl group or an aryl group; and $A_{43}$ and $A_{44}$ are each independently a hydrogen atom or a substituent.

2. The photothermographic material of claim 1, wherein Formula (3) is further represented by Formula (5), and Formula (4) is further represented by Formula (6):

Formula (5)

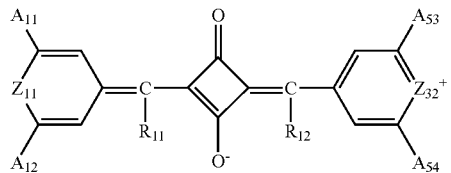

wherein $R_{11}$ and $R_{12}$ are each respectively the same as $R_{11}$ and $R_{12}$ in Formula (3); $Z_{11}$ is the same as $Z_{11}$ in Formula (3); $A_{11}$ and $A_{12}$ are each respectively the same as $A_{11}$ and $A_{12}$ in Formula (3); $Z_{32}$ is the same as $Z_{32}$ in Formula (3); and $A_{53}$ and $A_{54}$ are each independently a hydrogen atom or a substituent, provided that $A_{53}$ and $A_{54}$ are different groups from each other, Formula (6)

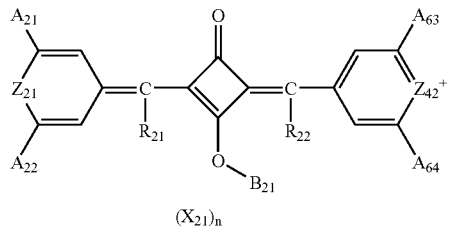

wherein $R_{21}$ and $R_{22}$ are each respectively the same as $R_{21}$ and $R_{22}$ in Formula (4); $Z_{21}$ is the same as $Z_{21}$ in Formula (4); $A_{21}$ and $A_{22}$ are each respectively the same as $A_{21}$ and $A_{22}$ in Formula (4); $B_{21}$ is the same as $Z_{21}$ in Formula (4); $X_{21}$ is the same in $X_{21}$ in Formula (4); n is the same as n in Formula (4); $Z_{42}$ is the same as $Z_{42}$ in Formula (4); and $A_{63}$ and $A_{64}$ are each independently a substituent, provided that $A_{63}$ and $A_{64}$ are different groups from each other.

3. The photothermographic material of claim 2, wherein Formula (5) is further represented by Formula (7), and Formula (6) is further represented by Formula (8):

Formula (7)

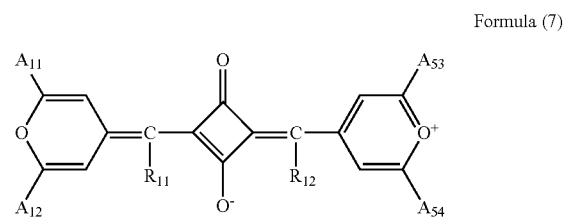

wherein $R_{11}$ and $R_{12}$ are each respectively the same as $R_{11}$ and $R_{12}$ in Formula (3); $A_{11}$ and $A_{12}$ are each respectively the same as $A_{11}$ and $A_{12}$ in Formula (3); and $A_{53}$ and $A_{54}$ are each respectively the same as $A_{53}$ and $A_{54}$ in Formula (5), Formula (8)

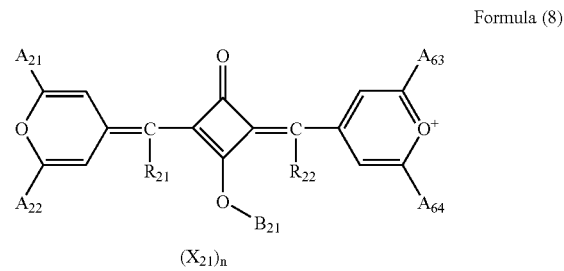

wherein $R_{21}$ and $R_{22}$ are each respectively the same as $R_{21}$ and $R_{22}$ in Formula (2); $A_{21}$ and $A_{22}$ are each respectively the same as $A_{21}$ and $A_{22}$ in Formula (4); $B_{21}$ is the same as $B_{21}$ in Formula (4); $X_{21}$ is the same as $X_{21}$ in Formula (4); n is the same as n in Formula (4) and $A_{63}$ and $A_{64}$ are each respectively the same as $A_{63}$ and $A_{64}$ in Formula (6).

4. A method of forming an image comprising the steps of:

exposing the photothermographic material of claim 1 with a laser; and heating the exposed photothermographic material to a temperature of 80 to 250° C.

* * * * *